US008849077B2

(12) United States Patent
Matsumoto

(10) Patent No.: US 8,849,077 B2
(45) Date of Patent: Sep. 30, 2014

(54) WAVELENGTH SELECTIVE SWITCH

(75) Inventor: Koji Matsumoto, Hachioji (JP)

(73) Assignee: JDS Uniphase Corporation, Milpitas, CA (US)

( * ) Notice: Subject to any disclaimer, the term of this patent is extended or adjusted under 35 U.S.C. 154(b) by 627 days.

(21) Appl. No.: 13/114,221

(22) Filed: May 24, 2011

(65) Prior Publication Data
US 2011/0292482 A1   Dec. 1, 2011

(30) Foreign Application Priority Data
May 25, 2010   (JP) .................................. 2010-119532

(51) Int. Cl.
| G02B 6/35 | (2006.01) |
| G02B 6/28 | (2006.01) |
| G02B 6/293 | (2006.01) |
| H04J 14/02 | (2006.01) |
| G02B 26/08 | (2006.01) |

(52) U.S. Cl.
CPC .......... H04J 14/0212 (2013.01); G02B 6/3542 (2013.01); G02B 6/3512 (2013.01); G02B 6/3558 (2013.01); G02B 6/356 (2013.01); G02B 26/0833 (2013.01); H04J 14/0213 (2013.01); H04J 14/0219 (2013.01)
USPC ..................... 385/18; 385/19; 385/24; 385/47

(58) Field of Classification Search
None
See application file for complete search history.

(56) References Cited

U.S. PATENT DOCUMENTS

| 6,549,699 | B2 * | 4/2003 | Belser et al. ..................... 385/24 |
| 6,978,061 | B1 * | 12/2005 | Tabuchi ......................... 385/18 |
| 7,072,539 | B2 * | 7/2006 | Wu et al. ......................... 385/18 |
| 7,330,617 | B2 * | 2/2008 | Aota et al. ....................... 385/18 |
| 7,599,587 | B2 * | 10/2009 | Nishizawa et al. ............. 385/18 |
| 7,653,273 | B2 | 1/2010 | Yamashita et al. |
| 2004/0136648 | A1 * | 7/2004 | Chen et al. ....................... 385/24 |
| 2006/0140536 | A1 * | 6/2006 | Aota et al. ....................... 385/18 |
| 2006/0291773 | A1 * | 12/2006 | Wu et al. ......................... 385/18 |
| 2009/0052839 | A1 * | 2/2009 | Shimizu et al. ................. 385/18 |
| 2011/0085222 | A1 | 4/2011 | Komiya |

FOREIGN PATENT DOCUMENTS

| JP | 2006-126561 | 5/2006 |
| JP | 2011-85688 A | 4/2011 |

* cited by examiner

*Primary Examiner* — Michelle R Connelly
(74) *Attorney, Agent, or Firm* — JDS Uniphase Corporation

(57) ABSTRACT

A wavelength selective switch includes a light input output portion having an input port and an output port for wavelength-multiplexed light, which are arranged in an array form in a first direction, a light dispersive unit which separates the wavelength-multiplexed light input from the input port, into signal wavelengths, a condenser element which condenses light separated into the signal wavelengths, and a light deflective element array which deflects the signal light in the first direction such that, respective signal wavelength light condensed by the condenser element is switched to a desired output port. In such wavelength selective switch, the light input output portion is divided into m groups, and the light deflective element array is arranged in m rows in the first direction to correspond with the m groups of the light input output portion, wherein m is an integer.

12 Claims, 38 Drawing Sheets

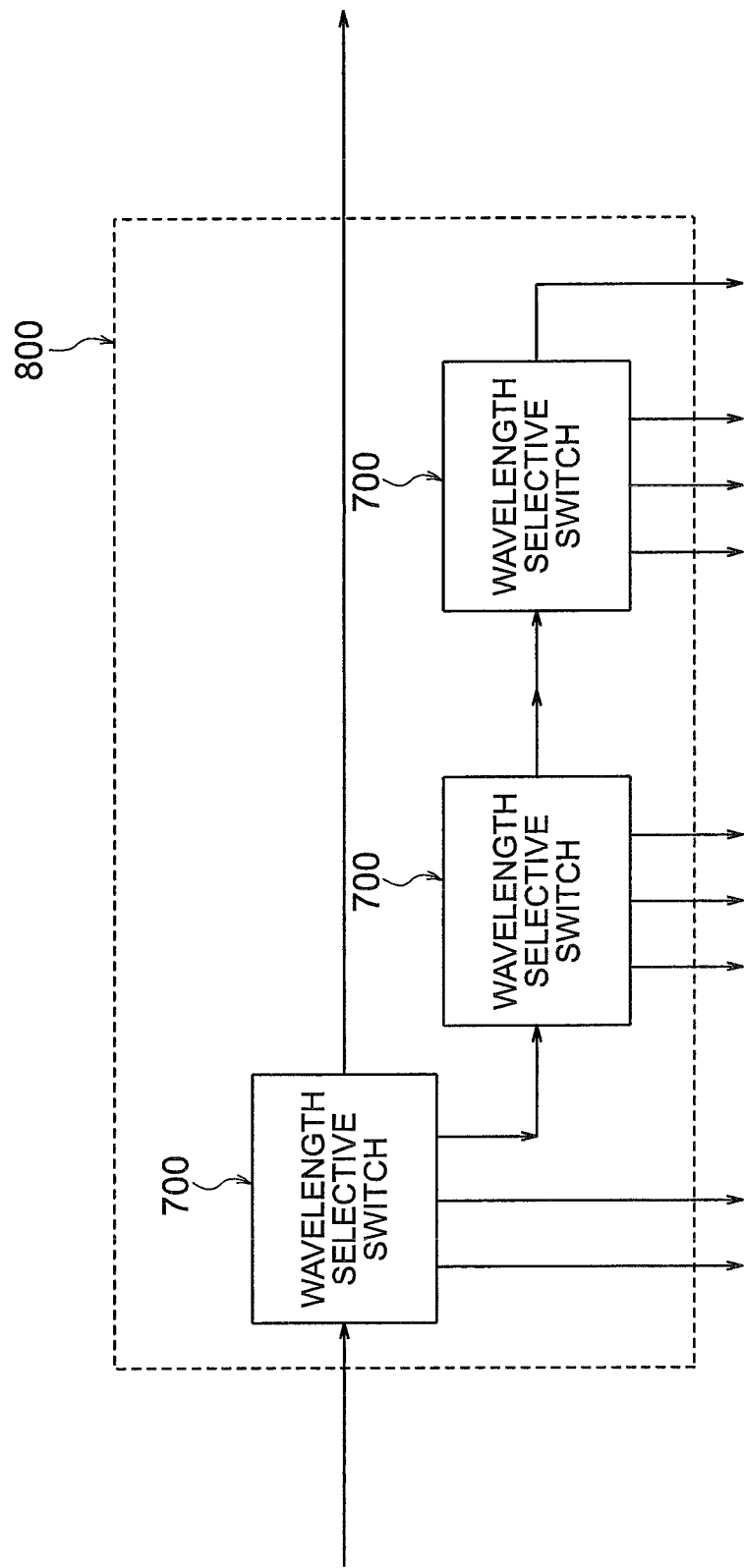

WAVELENGTH SELECTIVE SWITCH

CROSS-REFERENCE TO RELATED APPLICATION

The present application is based upon and claims the benefit of priority from the prior Japanese Patent Application No. 2010-119532 filed on May 25, 2010; the entire contents of which are incorporated herein by reference.

BACKGROUND OF THE INVENTION

1. Field of the Invention

The present invention relates to a wavelength selective switch.

2. Description of the Related Art

As an example of a conventional N×1 wavelength selective switch, a wavelength selective switch 500 of 5×1 used in FIG. 35 and FIG. 36 is available. FIG. 35 is a side view showing a structure of the conventional wavelength selective switch 500, and FIG. 36 is a top view showing the structure of the conventional wavelength selective switch 500. In this case, N is an integer greater than 1.

The wavelength selective switch 500 includes input ports 510a, 510b, 510c, and 510d (hereinafter, 'input ports 501a to 501d'), an output port 510e, a lens array 530, a first lens 540, a second lens 550, a dispersive element 560, a third lens 570, and a plurality of mirrors 590a, 590b, 590c, 590d, and 590e (hereinafter, 'mirrors 590a to 590e'). In the wavelength selective switch 500, light which is wavelength-multiplexed is input from an arbitrary input port from among the input ports 510a to 510d, and light of an arbitrary wavelength is selected from wavelengths separated by the dispersive element 560, and is output to the output port 510e. In FIG. 35 and FIG. 36, wavelength-multiplexed light of the input port 510a is shown to be output to the output port 510e.

It is desirable that the number of ports of a wavelength selective switch is increased, and when the number of ports is increased in the N×1 wavelength selective switch, for connecting an arbitrary input port to an output port, there is a need to increase a deflection angle of each mirror in the mirror array. However, there is a restriction on the deflection angle of the mirror, and the number of input ports to be connected to the output port is determined by this restriction. In 1×N wavelength selective switch, the number of output ports to be connected to the input port is determined by the deflection angle of a mirror similarly as in a case of N×1 wavelength selective switch.

Therefore, in the conventional N×1 wavelength selective switch or the 1×N wavelength selective switch, for increasing the number of ports, the number of input ports which are to be connected to the output port and the number of output ports which are to be connected to the input ports are increased by connecting in multiple stages, a plurality of independent M×1 wavelength selective switches or a plurality of 1×M wavelength selective switches. FIG. 37 is a block diagram showing a structure of a 10×1 wavelength selective switch 600 of an ADD type, and FIG. 38 is a block diagram showing a structure of a 1×10 wavelength selective switch 800 of a DROP type. In the 10×1 wavelength selective switch 600 shown in FIG. 37, the number of ports is increased by connecting three 5×1 wavelength selective switches 500 in three stages. Moreover, in the 1×10 wavelength selective switch 800 shown in FIG. 38, the number of ports is increased by connecting three 1×5 wavelength selective switches 700 in multiple stages.

However, as it has been mentioned above, in the conventional N×1 wavelength selective switch and the 1×N wavelength selective switch, since the plurality of M×1 wavelength selective switches and the plurality of 1×M wavelength selective switches are arranged to be connected in multiple stages for increasing the number of ports, a plurality of members of the wavelength selective switch to be arranged in M×1 or 1×M is necessary in manufacturing thereof. Moreover, assembly man-hours for that many numbers of members is necessary, thereby leading to an increase in a necessary cost of an overall apparatus. Moreover, in addition to the increased cost, when the apparatus is structured in multiple stages, an overall size of the apparatus becomes large, and there is an increase in weight of the apparatus.

SUMMARY OF THE INVENTION

The present invention has been made in view of the abovementioned circumstances and an object of the present invention is to realize a wavelength selective switch with a large number of ports, by using one wavelength selective switch and not a plurality of wavelength selective switches.

To solve the abovementioned issues and to achieve an object, a wavelength selective switch according to a first aspect of the present invention includes a light input output portion having an input port and an output port for wavelength-multiplexed light, which are arranged in an array form in a first direction, a light dispersive unit which separates the wavelength-multiplexed light which has been input from the input port, into respective signal wavelengths, a condenser element which condenses light which has been separated into the signal wavelengths, and a light deflective element array which deflects the signal light in the first direction such that, respective signal wavelength light which has been condensed by the condenser element is switched to a desired output port, and when m is let to be an integer, the light input output portion is divided into m number of groups, and the light deflective element array is arranged in m number of rows in the first direction to correspond with the m number of groups of the light input output portion, and the light dispersive unit is in common for the m number of groups of the light input output portion.

In the wavelength selective switch according to the first aspect of the present invention, it is preferable that light from the input port corresponding to each group of the light input output portion is incident at substantially the same position of the light dispersive unit.

In the wavelength selective switch according to the first aspect of the present invention, it is preferable that in a second direction which is orthogonal to the first direction, a position of the light deflective element array corresponding to different signal wavelengths is same for each of the m number of groups of the light input output portion.

A wavelength selective switch according to a second aspect of the present invention includes a light input output portion having an input port and an output port for wavelength-multiplexed light, which are arranged in an array form in a first direction, a light dispersive unit which separates the wavelength-multiplexed light which has been input from the input port, into respective signal wavelengths, a condenser element which condenses light which has been separated into the signal wavelengths, and a light deflective element array which deflects the signal light in the first direction such that, respective signal wavelength light which has been condensed by the condenser element is switched to a desired output portion, and when m is let to be an integer, the light input output portion is divided into m number of groups, and arranged in rows in a second direction which is orthogonal to the first direction, and m number of the light deflective arrays are arranged in rows to correspond with the m number of groups of the light input output portion, and the light dispersive unit is in common for the m number of groups of the light input output portion.

In the wavelength selective switch according to the second aspect of the present invention, it is preferable that light from the input portion corresponding to each group of the light input output portion is incident at substantially the same position of the light dispersive unit.

In the wavelength selective switch according to the second aspect of the present invention, it is preferable that in the second direction, a position of the light deflective element array corresponding to different wavelengths is same for each of the m number of groups of the light input output portion.

In the wavelength selective switch according to the second aspect of the present invention, it is preferable that in the second direction, a position of the light deflective element array corresponding to a same signal wavelength is same for each of the m number of groups of the light input output portion.

BRIEF DESCRIPTION OF THE DRAWINGS

FIG. 38 is a block diagram showing a structure of a 1×10 wavelength selective switch of a DROP type.

DETAILED DESCRIPTION OF THE INVENTION

Exemplary embodiments of a wavelength selective switch according to the present invention will be described below in detail by referring to the accompanying diagrams. However, the present invention is not restricted to the embodiments described below.

The wavelength selective switch described below is structured to be such that a plurality of input ports and output ports is divided into m number of groups, and m number of groups of MEMS (micro electro mechanical system) mirrors are provided in a direction orthogonal to a channel direction, to correspond with the m number of groups of input ports and output ports. Furthermore, the wavelength selective switch is structured to be such that locations at which, light passes through a dispersive element are same in all groups. Here, m is an integer greater than 1, and the channel direction is a direction in which, wavelength-multiplexed light is separated into a plurality of signal wavelength light by the dispersive element (light dispersive unit).

(First Embodiment)

Figure 1:
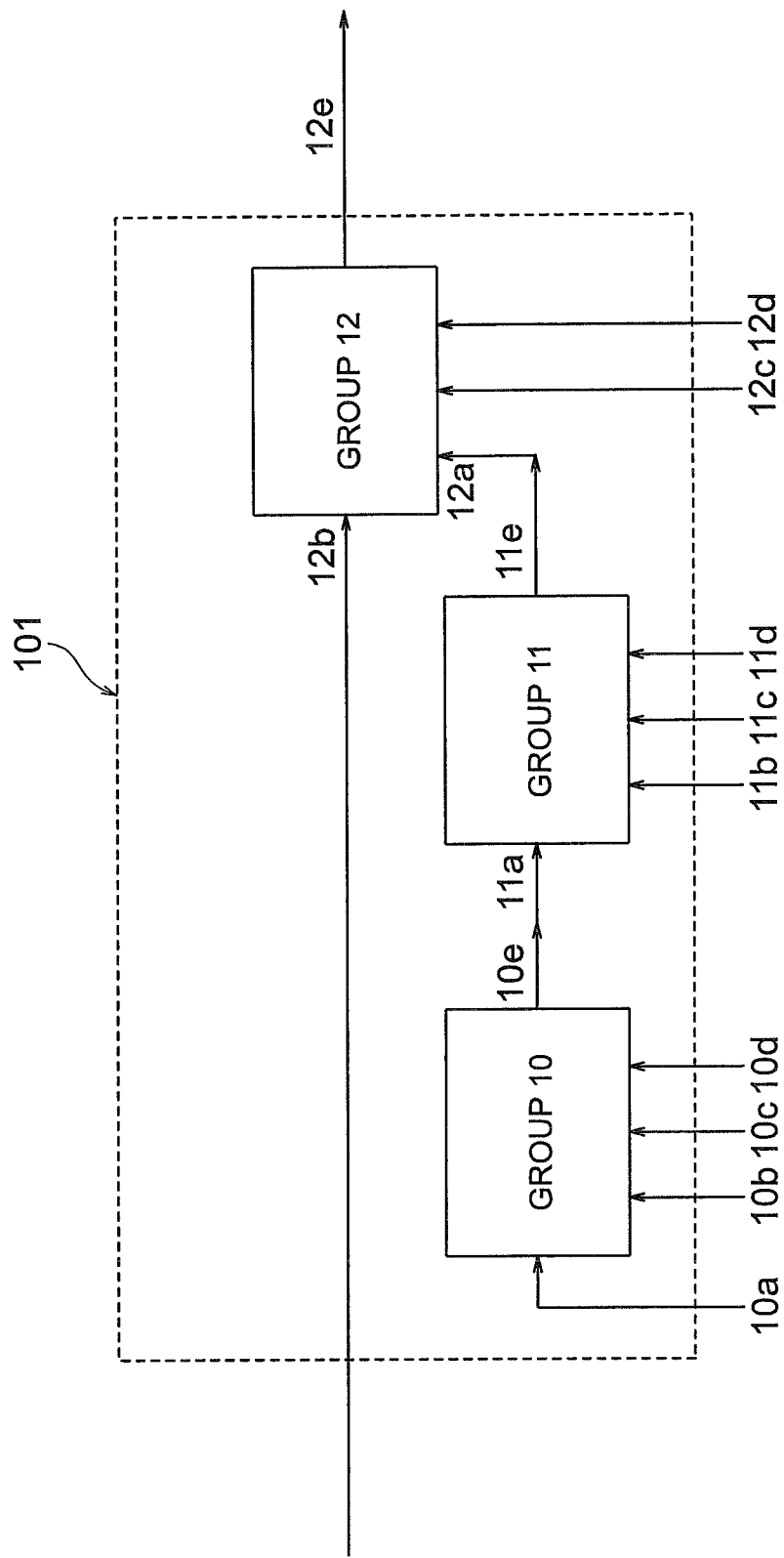
FIG. 1 is a block diagram showing a concept of a wavelength selective switch according to a first embodiment of the present invention.

FIG. 1 is a block diagram showing a concept of a wavelength selective switch 101 according to a first embodiment of the present invention. The wavelength selective switch 101 includes 10 input ports 10a, 10b, 10c, 10d, 11b, 11c, 11d, 12b, 12c, and 12d, and an output port 12e. At an interior of the wavelength selective switch 101, a connecting port 10e of a group 10 and a connecting port 11a of a group 11 are connected mutually, and a connecting port 11e of the group 11 and a connecting port 12a of a group 12 are connected mutually. The groups 10, 11, and 12 form an input output portion.

In FIG. 1, the 10 input ports and the output port indicate one N×1 wavelength selective switch (N=10). However, an alignment and the number of the input ports, the output ports, and the connecting ports is not restricted to an alignment and the number of ports in FIG. 1.

An example in which, light which has been input from the input port 10a is output to the output port 12e, will be described below.

Light which has been input from the input port 10a is wavelength-multiplexed light of one or more than one wavelength, and light which is output to the output port 12e is wavelength-multiplexed light of one or more than one wavelength. A path of light from the input port 10a up to the output port 12e will be explained below by referring to diagrams from FIG. 2 to FIG. 10 upon dividing into three paths namely, (1) a path from the input port 10a up to the connecting port 10e, (2) a path from the connecting port 11a up to the connecting port 11e, and (3) a path from the connecting port 12a up to the output port 12e.

Figure 2:
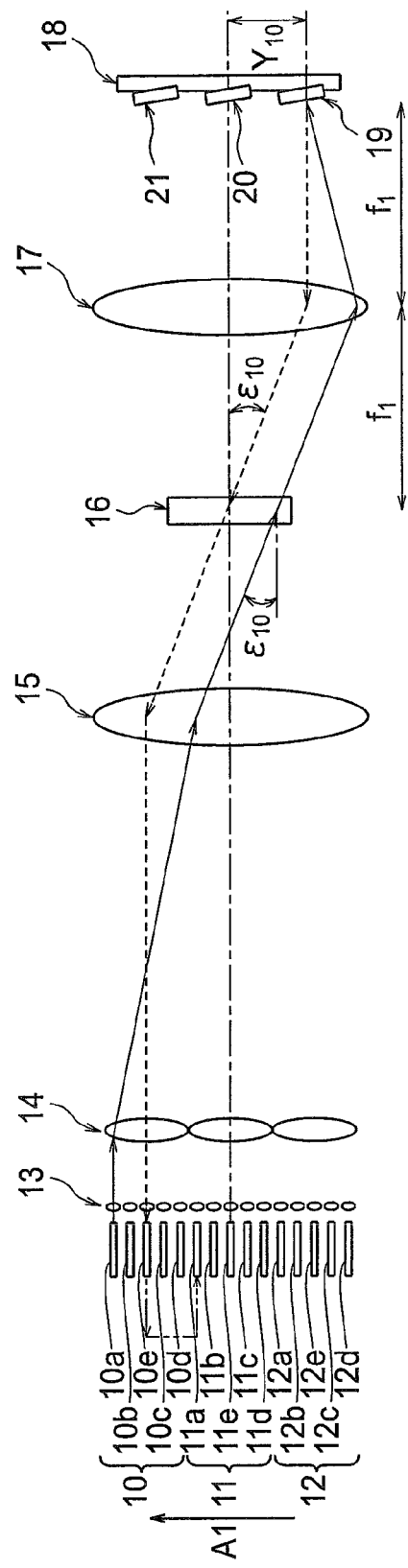
FIG. 2 is a side view showing a structure of the wavelength selective switch according to the first embodiment.
Figure 3:
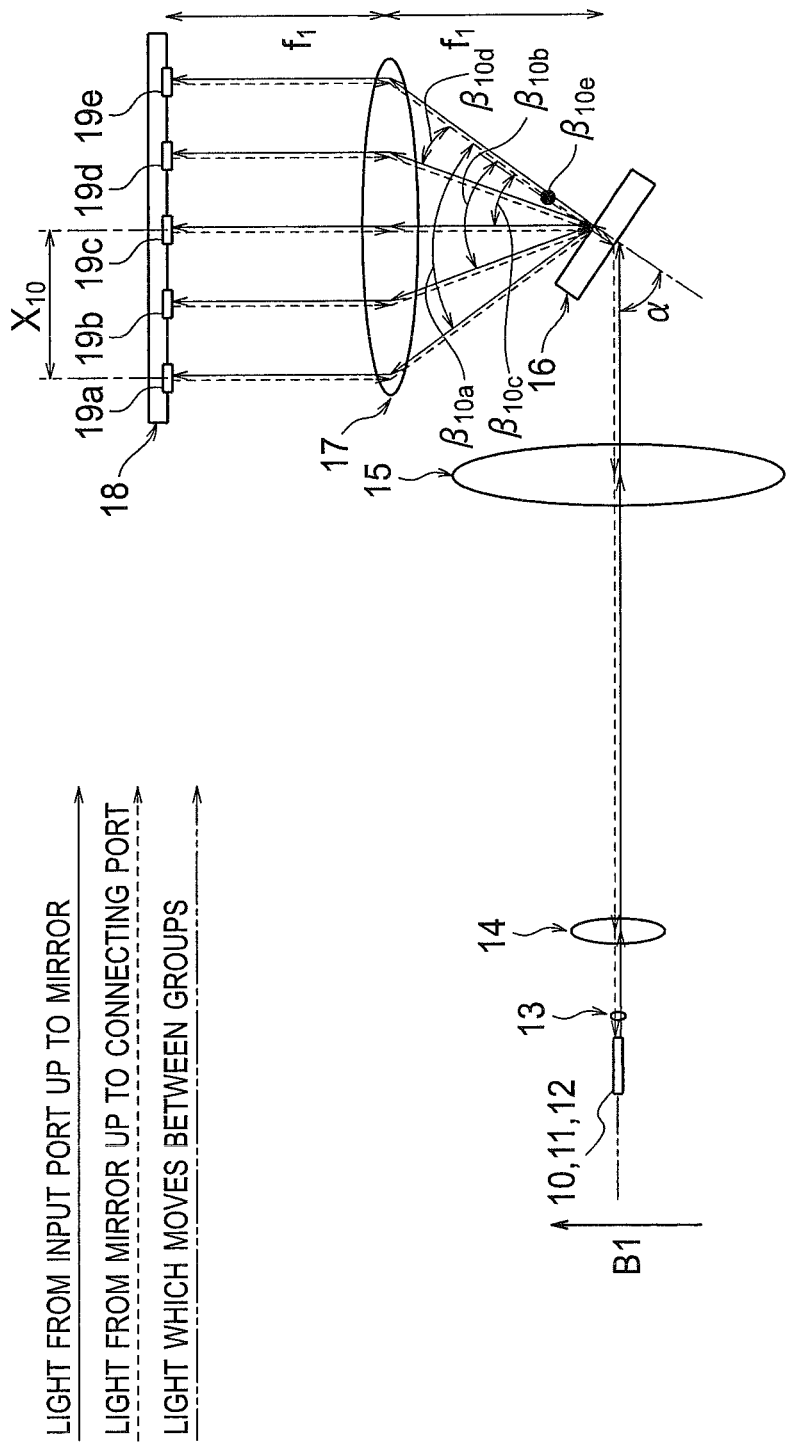
FIG. 3 is a top view showing the structure of the wavelength selective switch according to the first embodiment.
Figure 4:
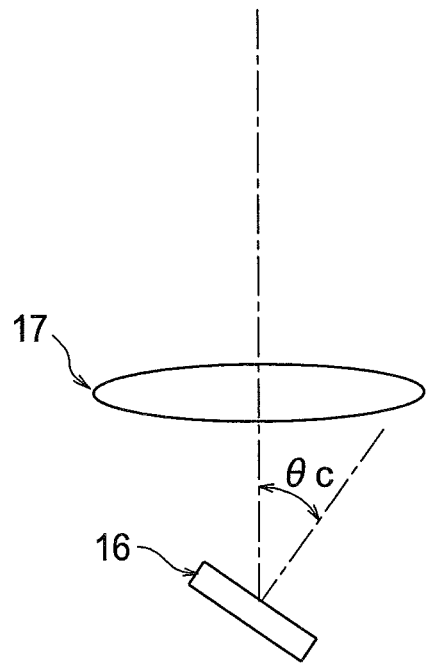
FIG. 4 is a diagram in which, a dispersive element and a second lens in FIG. 3 are shown in an enlarged form.
Figure 5:
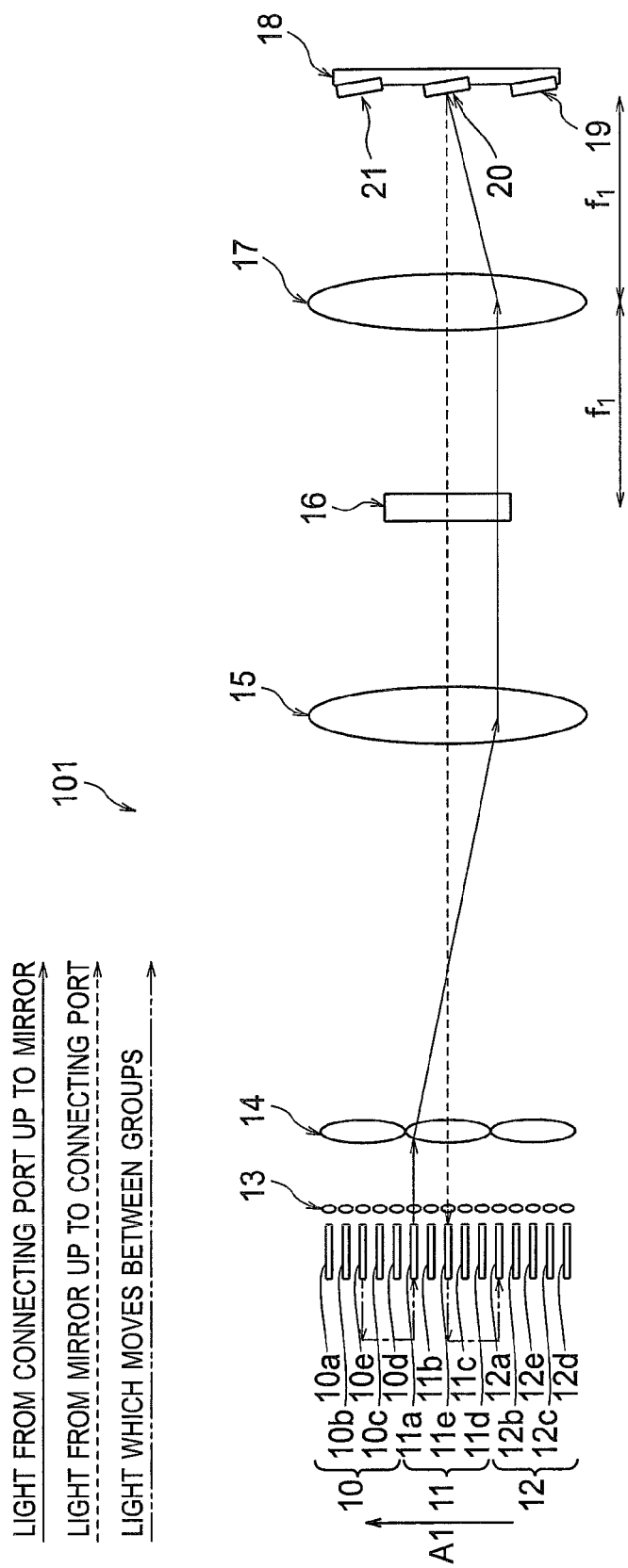
FIG. 5 is a side view showing the structure of the wavelength selective switch according to the first embodiment.
Figure 6:
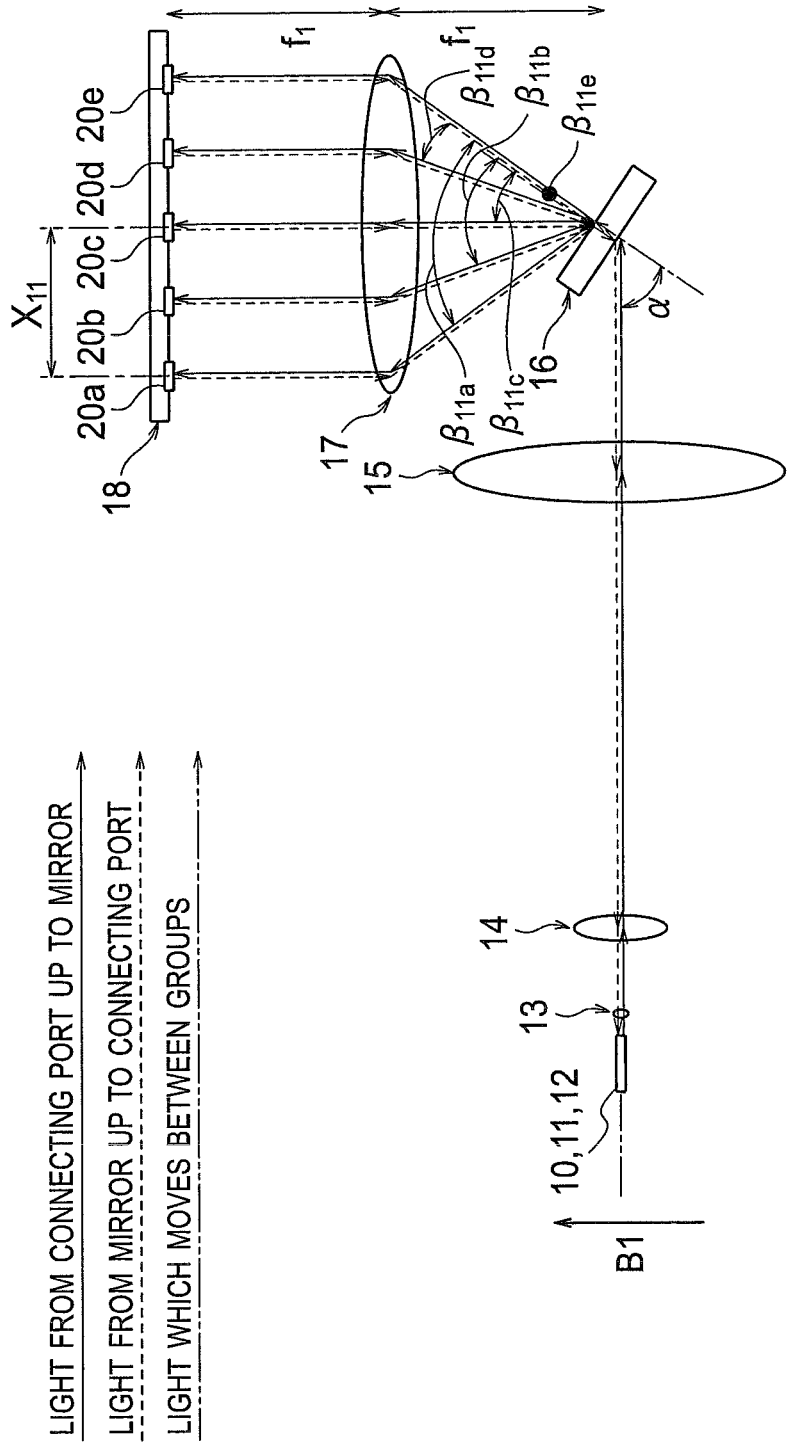
FIG. 6 is a top view showing the structure of the wavelength selective switch according to the first embodiment.
Figure 7:
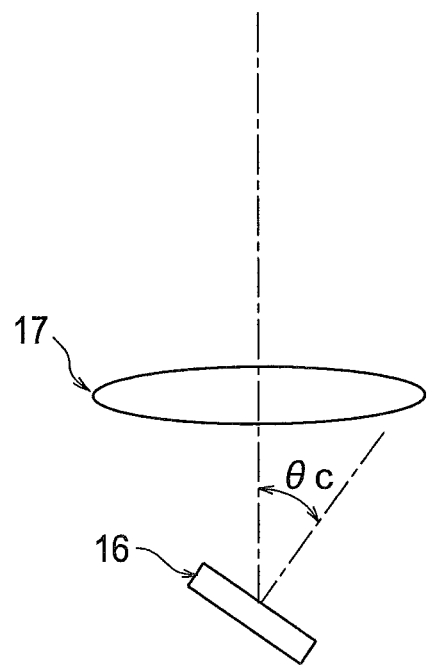
FIG. 7 is diagram in which, the dispersive element and the second lens in FIG. 6 are shown in an enlarged form.
Figure 8:
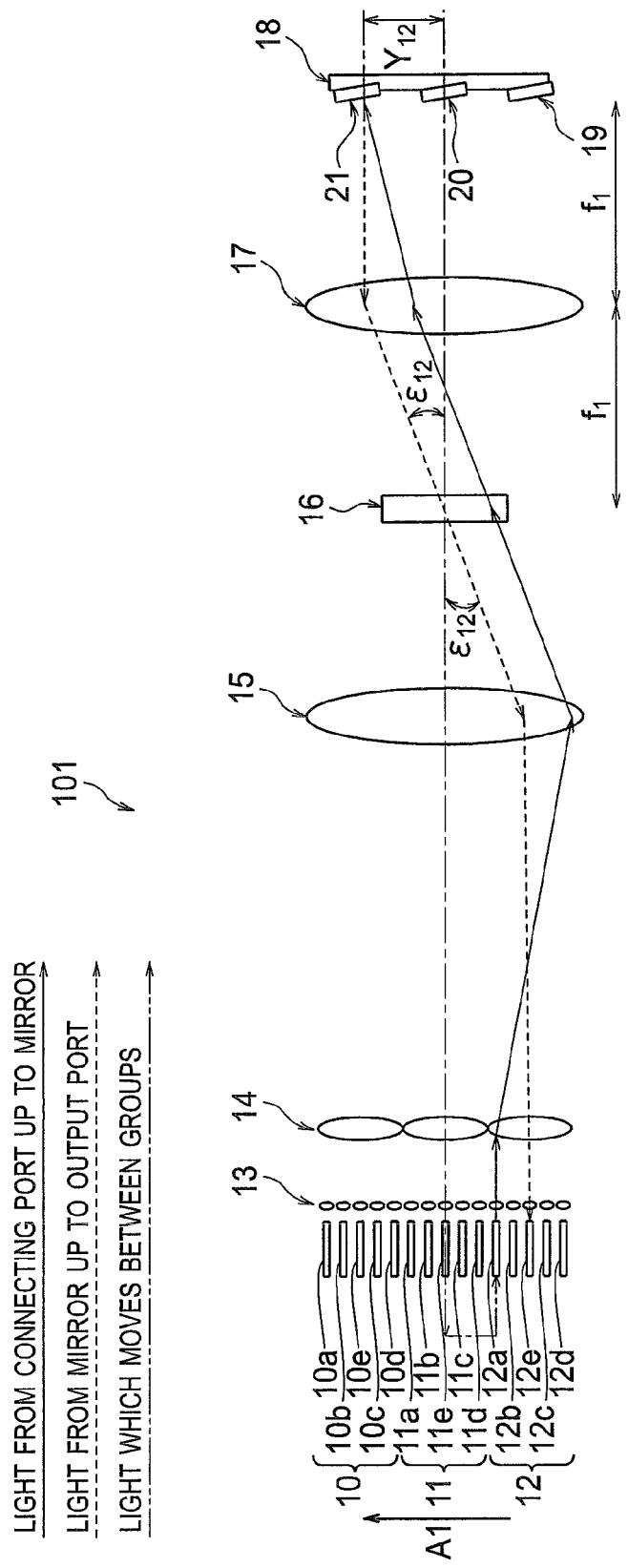
FIG. 8 is a side view showing the structure of the wavelength selective switch according to the first embodiment.
Figure 9:
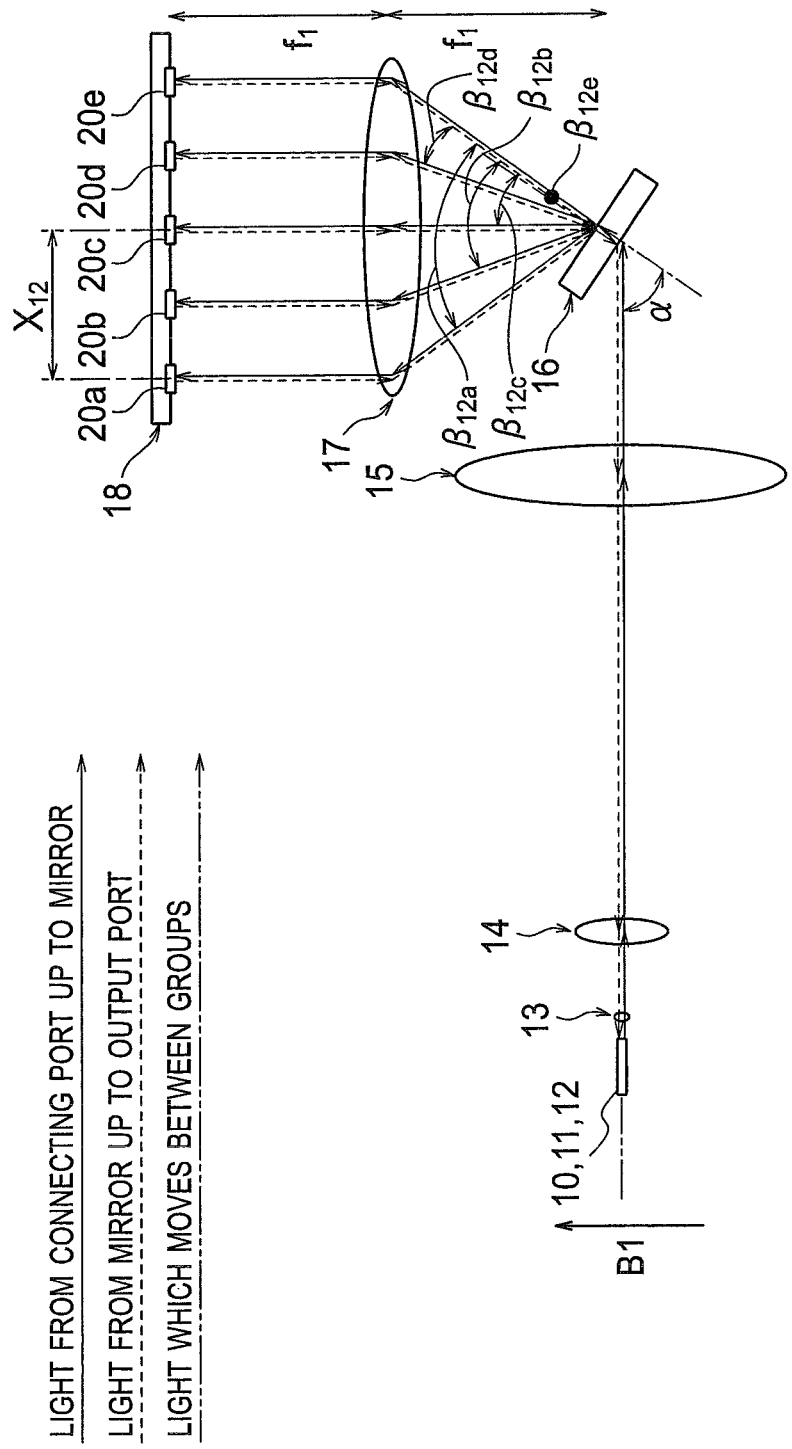
FIG. 9 is a top view showing the structure of the wavelength selective switch according to the first embodiment.
Figure 10:
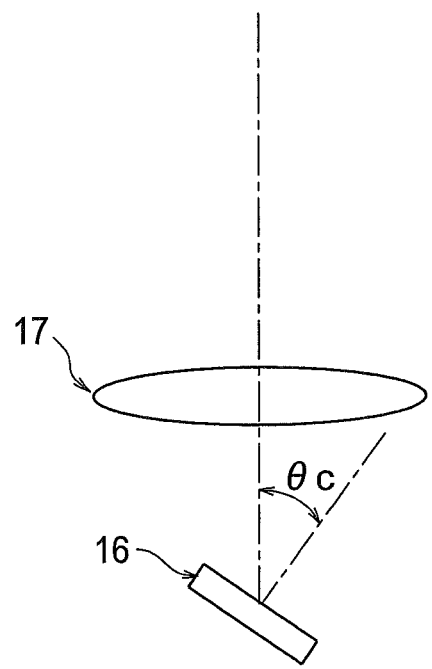
FIG. 10 is a diagram in which, the dispersive element and the second lens in FIG. 9 are shown in an enlarged form.

FIG. 2, FIG. 5, and FIG. 8 are side views showing a structure of the wavelength selective switch 101. FIG. 3, FIG. 6, and FIG. 9 are top views showing a structure of the wavelength selective switch 101. FIG. 4, FIG. 7B, and FIG. 10 are diagrams in which, a dispersive element and a second lens in FIG. 3, FIG. 6, and FIG. 9 are shown in an enlarged form.

FIG. 2, FIG. 3, and FIG. 4 indicate a path of light which has been input from the input port 10a till the light input is condensed at the connecting port 10e. FIG. 5, FIG. 6, and FIG. 7 indicate a path in which light condensed at the connecting port is input from the connecting port 11a, till the light is condensed at the connecting port 11e. FIG. 8, FIG. 9, and FIG. 10 indicate a path in which, light condensed at the connecting port 11e is input from the connecting port 12a, till the light is condensed at the output port 12e.

The wavelength selective switch 101 according to the first embodiment has the abovementioned plurality of input ports, output ports and the connecting ports, a first lens array 13, a second lens array 14, a first lens 15, a dispersive element 16, a second lens 17, and a mirror array 18. Wavelength-multiplexed light which has been input from the input port 10a passes to the first lens array 13, an becomes collimated light by lenses of the first lens array 13 corresponding to the input port 10a. The first lens array 13 has lenses corresponding to the input ports, the output ports, and the connecting ports respectively. Moreover, in FIG. 2, FIG. 3, and FIG. 4, the light being input only to the input port 10a is shown in a simplified manner. However, practically, wavelength-multiplexed light is input from the plurality of input ports.

The input ports, the output ports, and the connecting ports are divided into three groups 10, 11, and 12. The groups 10, 11, and 12 are connected mutually by the connecting ports, and each group has at least one connecting port.

The group 10 has a structure in which, the input ports 10a, 10b, 10c, and 10d are aligned at an equal interval along a first direction A1, with the connecting port 10e as a center. The group 11 has a structure in which, the connecting port 11a, the input ports 11b, 11c, and 11d, and the connecting port 11e are aligned at an equal interval along the first direction A1, with the connecting port 11e as a center. The group 12 has a structure in which, the connecting port 12e, the input ports 12b, 12c, and 12d, and the output port 12e are arranged at an equal interval along the first direction A1, with the output port 12e as a center. Furthermore, the groups 10, 11, and 12 are disposed along the first direction in order of the groups 10, 11, and 12.

As shown in FIG. 2 and FIG. 3, light which has been collimated by a lens of the first lens array 13 is condensed by a lens corresponding to the group 10, of the second lens array 14. A position of condensed light is a position at which, light of the plurality of input ports of the group 10 intersect. Moreover, the position of condensed light intersects with an optical axis of the lens of the second lens array 14, corresponding to the group 10. A position of condensed light of each lens of the second lens array 14 is a position which differs according to each group.

Figure 11:
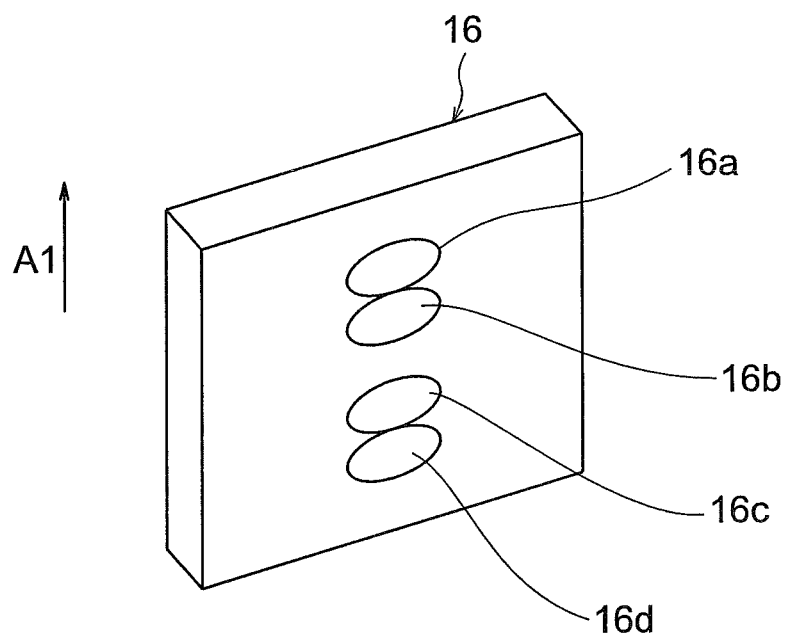
FIG. 11 is a perspective view showing a spot which is formed by light which is incident on the dispersive element of the first embodiment.

Light which has been condensed by the second lens array 14 enters the first lens 15 which is a lens common to all groups, in a state of a light beam having a spreading, and upon being collimated by the first lens 15, is output toward the dispersive element 16. An optical axis of the lens corresponding to the group 10, of the second lens array 14, and an optical axis of the first lens 15 are at positions shifted in the first direction A1. Therefore, light beam which has been collimated by the first lens 15 is incident to be inclined by only $\epsilon_{10}$ in the first direction A1 (FIG. 2). Light which is incident on the dispersive element 16 from the plurality of input ports of the group 10 is incident as four spots 16a, 16b, 16c, and 16d for each input port as shown in FIG. 11. FIG. 11 is a perspective view showing spots which are formed by light incident on the dispersive element 16.

In addition to light from the input ports of the group 10, when seen for each group, light from the input ports of the group 11 and the group 12 which are different from the group 10, is incident on the spots 16a, 16b, 16c, and 16d. Concretely, light which is incident on the dispersive element 16 from the input port 10a and the connecting ports 11a and 12a is incident as the spot 16a, light which is incident on the dispersive element 16 from the input ports 10b, 11b, and 12b is incident as the spot 16b, light which is incident on the dispersive element 16 from the input ports 10c, 11c, and 12c is incident as the spot 16c, and light which is incident on the dispersive element 16 from the input ports 10d, 11d, and 12d is incident as the spot 16d.

For the dispersive element 16 which is to be used in the wavelength selective switch 101, an element having a structure of a normal diffractive grating is to be used. When an angle of incidence at which a light beam from the first lens 15 enters the dispersive element 16 is let to be α (FIG. 3, FIG. 6, and FIG. 9), an output angle $\beta_{10a}$ at which, the light is dispersed by the dispersive element 16 is expressed by the following expression (1).

$$\sin \beta_{10a} = [(m\lambda)/(d \cos \epsilon_{10})] - \sin \alpha \quad (1)$$

where, m denotes an diffraction order of a diffractive grating used in the dispersive element 16, d denotes a pitch of the diffractive grating used in the dispersive element 16, and λ denotes a wavelength of light incident on the dispersive element 16.

Output angles $\beta_{10b}$, $\beta_{10c}$, $\beta_{10d}$, and $\beta_{10e}$ are also expressed by expression (1), similarly as $\beta_{10a}$. Output angles $\beta_{10a}$, $\beta_{10b}$, $\beta_{10c}$, $\beta_{10d}$, and $\beta_{10e}$ are angles made by a second direction B1 with respect to a normal line of a launching surface of the dispersive element 16.

The dispersive element 16 disperses light which has been collimated by the first lens 15, in the second direction B1, at an angle which differs according to the wavelength. Dispersion of light only for five wavelengths is shown in FIG. 3 in a simplified manner. Wavelength-multiplexed light which enters the dispersive element 16 advances in the second direction B1, at the angles $\beta_{10a}$, $\beta_{10b}$, $\beta_{10c}$, $\beta_{10d}$, and $\beta_{10e}$ which are mutually different according to the wavelength.

A transmission dispersive element as in FIG. 2, FIG. 3, and FIG. 4 is shown as an example of the dispersive element 16. However, a reflection dispersive element may also be used as the dispersive element 16.

It is desirable that the second lens 17 is a lens in common for all the groups having a focal length $f_1$, and that the dispersive element 16 and the second lens 17 are separated only by the focal length $f_1$. This is because, when the dispersive element 16 and the second lens 17 are disposed at positions shifted from the focal length $f_1$, an angle of light of each wavelength output from the second lens 17 differs according to the wavelength. In other words, when a distance between the dispersive element 16 and the second lens 17 is let to be same as the focal length $f_1$, light launched from the second lens 17 advances in a direction coinciding for each wavelength, and advances toward mirrors 19a, 19b, 19c, 19d, and 19e of the mirror array 18. Light of each wavelength dispersed by the dispersive element 17 is condensed on the mirror 19 (the mirrors 19a, 19b, 19c, 19d, and 19e) corresponding to respective wavelength of the mirror array 18, by the second lens 17.

A position of condensing on the mirror 19, when the wavelength of the plurality of input ports of the group 10 is same, is a position at which the light intersects. Furthermore, a position of condensing by the second lens 17 differs for each group. Coordinates $X_{10a}$ and $Y_{10}$ of a position at which light is condensed by the second lens 17 when a point at which an optical axis of the second lens 17 and the mirror array 18 intersect is let to be a center are expressed by the following expressions (2) and (3) respectively.

$$X_{10a} = f_1 \tan(\beta_{10a} - \theta c) \qquad (2)$$

$$Y_{10} = f1 \tan \epsilon 10 \qquad (3)$$

where,

θc denotes an angle made by the optical axis of the second lens 17 and a normal line of the dispersive element 16 as shown in FIG. 4.

$X_{10a}$ is a coordinate of a position on the mirror 19a at which the light is condensed, and $X_{10b}$, $X_{10c}$, $X_{10d}$, and $X_{10e}$ corresponding to the mirrors 19b, 19c, 19d, and 19e are expressed by the abovementioned expression (2), similarly as $X_{10a}$.

Figure 12:
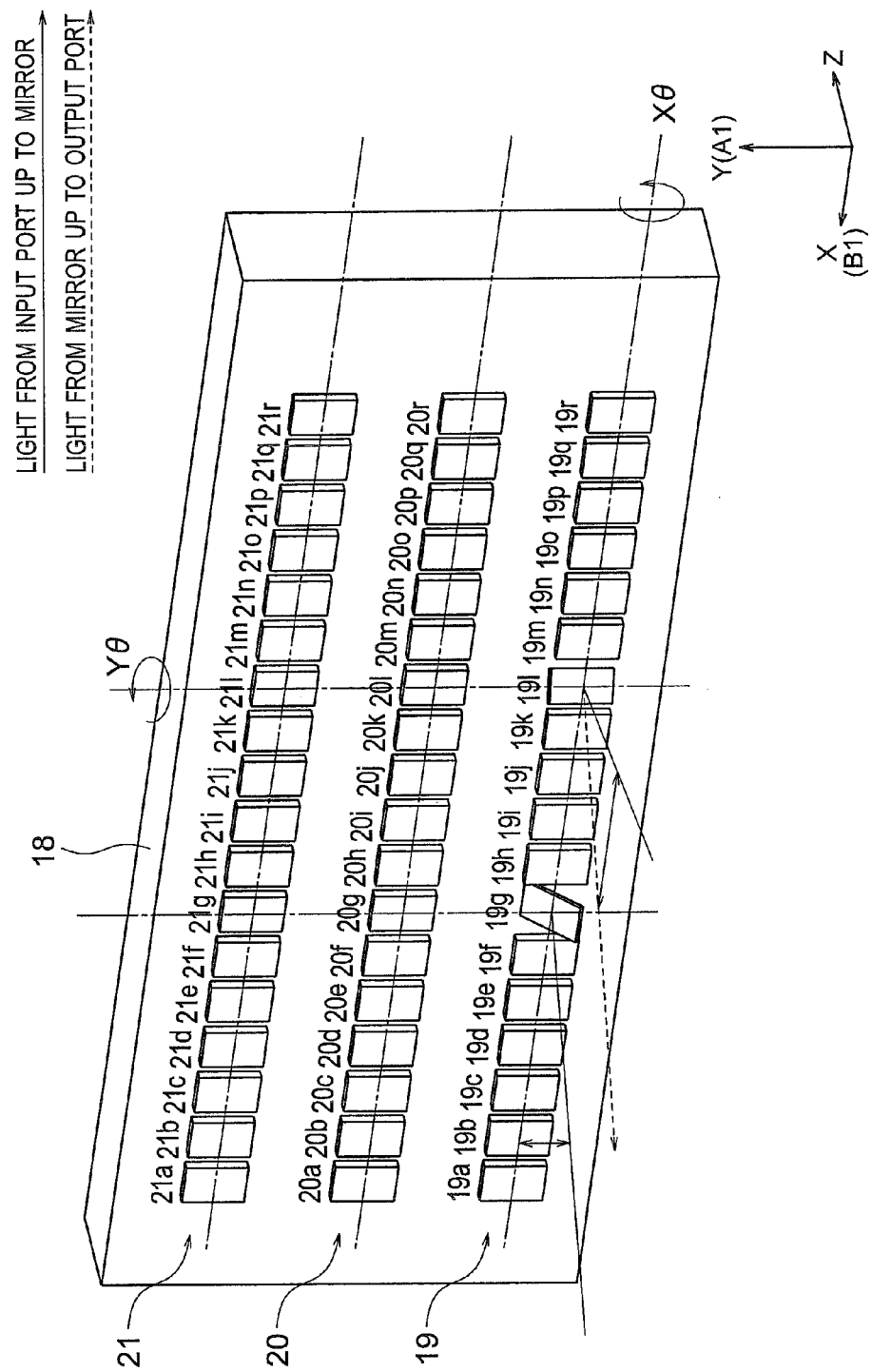
FIG. 12 is a perspective view as seen from a second-lens side, showing a structure of a mirror array of the first embodiment.

In the wavelength selective switch 101, the number of mirror arrays same as the number of groups is arranged in a row in the first direction A1 such that, at least the position at which the light is condensed by the second lens 17 differs according to the group. Concretely, the mirror array 18, as shown in FIG. 12, has a plurality of mirrors arranged in a row, with the number of mirrors same as at least the number of wavelengths in the second direction B1, same as at least the number of groups in the first direction A1. Here, FIG. 12 is a perspective view as seen from the second lens 17 side, showing a structure of the mirror array 18. In the mirror array 18, each mirror is capable of rotating around Xθ which rotates around an X-axis as a center, and Yθ which rotates around a Y-axis as a center. Here, X-axis corresponds to the second direction B1 and Y-axis corresponds to the first direction A1.

Light of each of wavelengths $\lambda_1$ to $\lambda_{18}$ of the group 10, dispersed according to the wavelength by the dispersive element 16 is condensed at a center of corresponding mirrors 19a to 19r respectively. Light which is condensed on the mirror is incident obliquely on a reflecting surface of the mirror, and is reflected by the mirror in a direction different from a direction of incidence.

Light which has been reflected by the mirror 19 of the mirror array 18 enters the second lens 17 in the form of a light beam having a flare. Light of each wavelength which has entered the second lens 17 becomes collimated light and advances from the second lens 17 to the dispersive element 16, and is incident obliquely at $\epsilon_{10}$ with respect to the first direction A1 of the dispersive element 16 (FIG. 2). When an angle of rotation of each mirror is same, the light from the second lens 17 is condensed at one point on the dispersive element 16, and light reflected by the mirror array 18 which has been input from the plurality of input ports of the group 10 at the time of being incident on the dispersive element 16 is incident at a same location as of reflected light of the group 11 and group 12 which are different groups.

Light which has been wavelength-multiplexed by the dispersive element 16 enters the first lens 15 maintaining the collimated form, and is condensed by the lens 15. A position of light condensed is a position at which, light reflected by the mirror array 18 intersect, and this position is a position of intersection with an optical axis of a lens corresponding to the group 10, of the second lens array 14.

Light which has been condensed by the first lens 15 is collimated by a lens corresponding to the group 10, of the second lens array 14, and enters a lens corresponding to the connecting port 10e, of the first lens array 13. A position at which, the light is condensed by the first lens 15 intersects with an optical axis of the second lens array 14, corresponding to the group 10. Light which has entered the lens of the first lens array 13 corresponding to the connecting port 10e is condensed at the connecting port 10e (FIG. 2).

As shown in FIG. 1, the connecting port 10e and the connecting port 11a are connected mutually. Accordingly, light having wavelengths combined or separated at the group 10 becomes a wavelength-multiplexed light of one or more than one wavelength, and advances from the connecting port 11a of the group 11 toward the first lens array 13, and becomes light collimated by the lens of the first lens array 13 corresponding to the connecting port 11a (FIG. 5).

As shown in FIG. 5 and FIG. 6, light which has been collimated by the lens of the first lens array 13 is condensed by a lens corresponding to the group 11, of the second lens array 14. A position at which, the light is condensed is a position at which, light of the connecting port 11a and the plurality of input ports of the group 11 intersect. Moreover, the position at which, the light is condensed intersects with an optical axis of the lens corresponding to the group 11, of the second lens array 14. A position at which, the light is condensed of each lens of the second lens array 14 is a position which differs according to the group.

Light which has been condensed by the second lens array 14 enters the first lens 15 which is a common lens for all the groups, in the form of a light beam having a flare, and upon being collimated by the first lens 15, is output toward the dispersive element 16. An optical axis of the lens of the first lens array 14 corresponding to the group 11, and the optical axis of the first lens 15 coincide, and light from the first lens 15 is incident at right angles to the first direction A1 with respect to the dispersive element 16 (FIG. 5). Light which is incident on the dispersive element 16 from the connecting port 11a and the plurality of input ports of the group 11, as shown in FIG. 11, is incident on the same location as of light from the other ports corresponding to the group 10 and the group 12.

The dispersive element 16 disperses the light which has been collimated by the first lens 15, in the second direction B1, at an angle which differs according to the wavelength. An angle of incidence of light on the dispersive element 16 from the connecting port 11a and the plurality of input ports of the group 11 being a right angle ($\epsilon_{11}=0$) with respect to the first direction A1, an output angle $\beta_{11a}$ at which, the light is dispersed by the dispersive element 16 is to be calculated by the following conditional expression (4).

$$\sin \beta_{11a} = (m\lambda/d) - \sin \alpha \quad (4)$$

Output angles $\beta_{11b}$, $\beta_{11c}$, $\beta_{11d}$, and $\beta_{11e}$ are also expressed similarly as $\beta_{11a}$, by the abovementioned expression (4). The output angles $\beta_{11a}$, $\beta_{11b}$, $\beta_{11c}$, $\beta_{11d}$, and $\beta_{11e}$ are angles made by the second direction B1 with respect to a normal line of a surface of the dispersive element 16 from which the light is launched.

The wavelength-multiplexed light which is incident on the dispersive element 16 advances in the second direction B1, at an angle which differs according to each wavelength, and even when the angle is for the same wavelength, the angle differs from a case of the group 10. The manner in which the light is dispersed is shown only for five wavelengths in FIG. 6 in a simplified manner.

The dispersive element 16 and the second lens 17 being separated only by the distance same as the focal length $f_1$, the light launched from the second lens 17 advances in a direction which coincides for each wavelength, or in other words, in a direction toward the mirror 20 of the mirror array 18. Light of each wavelength which has been dispersed by the dispersive element 16 is condensed by the second lens 17, on the respective mirror 20 of the mirror array 18, corresponding to each wavelength.

A position at which, the light is condensed on the mirror 20, in a case when the wavelengths of the connecting port 11a or the plurality of input ports of the group 11 are same, is a position of intersection of that light, and coordinate $X_{11a}$ in the second direction B1 of that position is expressed by the following expression (5).

$$X_{11a} = f_1 \tan(\beta_{11a} - \theta c) \quad (5)$$

$X_{11a}$ is a coordinate of a position on the mirror 22a, at which the light is condensed, and coordinates $X_{11b}$, $X_{11c}$, $X_{11d}$, and $X_{11e}$ corresponding to the mirrors 22b, 22c, 22d, and 22e are expressed similarly as $X_{11a}$, by the abovementioned expression (5).

As shown in the abovementioned expression (5), the X-coordinate depends on a size of an output angle $\beta_{11}$ of light from the dispersive element 16, and the size of the output angle $\beta_{11}$, even when it is the same wavelength, differs from the size of the output angle $\beta_{10}$ for the group 10. Moreover, an angle at which, the light is incident from the connecting port 11a on the dispersive element 16 being a right angle with respect to the first direction A1 ($\epsilon_{11}=0$), coordinate $Y_{11}$ in the first direction A1 of the position at which the light is condensed becomes $Y_{11}=0$. Consequently, the position of the group 11 at which the light is condensed by the second lens 17 differs from a case of the group 10 for both the X-coordinate and the Y-coordinate.

Light of wavelengths from $\lambda_1$ to $\lambda_{18}$ which have been dispersed according to the wavelength by the dispersive element 16 are condensed at centers of corresponding mirrors 20a to 20r of the mirror array 18. The light which is condensed on the mirror is incident obliquely on a reflecting surface of the mirror, and is reflected in a direction different from the direction of incidence. The mirrors 20a to 20r are disposed such that positions thereof in the first direction A1 intersect the optical axis of the second lens 17.

The light which has been reflected by the mirror 20 of the mirror array 18 enters the second lens 17 in the form of a light beam with a flare. The light of each wavelength which has entered the second lens 17, upon becoming collimated light, advances from the second lens 17 toward the dispersive element 16, and is incident at right angles with respect to the first direction A1 of the dispersive element 16 (FIG. 5). When an angle of rotation of each mirror is the same, the light from the second lens 17 is condensed at one point on the dispersive element 16, and light reflected from the mirror array 18, which has been input from the connecting port 11a and the plurality of input ports of the group 11, at the time of being incident on the dispersive element 16 is incident at the same location as of the group 10 and the group 12 which are different groups.

The light which has been wavelength-multiplexed by the dispersive element 16 enters the first lens 15 maintaining the state of being collimated, and is condensed by the first lens 15. A position at which the light is condensed is a position of intersection of the light reflected by the connecting port 11a and the plurality of input ports from the mirror array 18 of the group 11, and this position is a position of intersection with an optical axis of a lens corresponding to the group 11, of the second lens array 14.

The light which has been condensed by the first lens 15 is collimated by the lens corresponding to the group 11, of the second lens array 14, and enters a lens of the first lens array 13, corresponding to the connecting port 11e. The light which has entered the lens of the first lens array 13 corresponding to the connecting port 11e is condensed at the connecting port 11e.

As shown in FIG. 1, the connecting port 11e and the connecting port 12a are connected mutually. Accordingly, light having wavelengths combined or separated at the group 11 becomes wavelength-multiplexed light of one or more than one wavelength, and advances from the connecting port 12a of the group 12 toward the first lens array 13, and becomes light collimated by the lens of the first lens array 13 corresponding to the connecting port 12a (FIG. 8).

The light which has been collimated by the lens of the first lens array 13 is condensed by a lens corresponding to the group 12, of the second lens array 14. A position at which the light is condensed is a position of intersection of light of the connecting port 12a and the plurality of input ports of the group 12. Moreover, this position at which the light is condensed intersects an optical axis of the lens corresponding to the group 12, of the second lens array 14, and differs according to the group.

The light which has been condensed by the second lens array 14 enters the first lens 15 which is a lens in common for all the groups, in the form of a light beam with a flare, and upon being collimated by the second lens 15, is output toward the dispersive element 16. An optical axis of the lens corresponding to the group 12, of the second lens array 14 and the optical axis of the first lens 15 are at positions shifted in the first direction A1. Therefore, the light which has been collimated by the first lens 15 is incident to be inclined by $\epsilon_{12}$ in the first direction A1 (FIG. 8). The light which is incident on the dispersive element 16 from the connecting port 12a and the plurality of input ports of the group 12, as shown in FIG. 11, is incident on the same location as of light from the other groups 10 and 11 which are different groups.

The dispersive element 16 disperses the light which has been collimated at the first lens 15 in the second direction B1, at an angle which differs according to the wavelength. An angle of incidence of light on the dispersive element 16 from the connecting port 12*a* and the plurality of input ports of the group 12 being inclined only by angle $\beta_{12}$ with respect to the first direction A1, an output angle $\beta_{12a}$ at which, the light is dispersed by the dispersive element 16 is to be calculated by the following conditional expression (6).

$$\sin \beta_{12a} = (m\lambda/d \cos \epsilon_{12}) - \sin \alpha \qquad (6)$$

Output angles $\beta_{12b}$, $\beta_{12c}$, $\beta_{12d}$, and $\beta_{12e}$ are also expressed similarly as $\beta_{12a}$, by the abovementioned expression (6). The output angles $\beta_{12a}$, $\beta_{12b}$, $\beta_{12c}$, $\beta_{12d}$, and $\beta_{12e}$ are angles made by the second direction B1 with respect to a normal line of a surface of the dispersive element 16 from which the light is launched.

The wavelength-multiplexed light which enters the dispersive element 16 advances in the second direction B1, at an angle which differs according to each wavelength, and even when the angle is for the same wavelength, $\epsilon_{12}$, $\epsilon_{11}$, and $\epsilon_{10}$ not being same mutually, the angle differs from a case of the groups 10 and 11. The manner in which the light is dispersed is shown only for five wavelengths in FIG. 9 in a simplified manner.

The second lens 17 is a lens in common for all groups, having a focal length $f_1$, and a distance of the first lens 17 from the dispersive element 16 is same as the focal length $f_1$. Therefore, the light which has launched from the second lens 17 advances in a direction coinciding for each wavelength, toward the mirror 21 of the mirror array 18. Light of each wavelength which has been dispersed by the dispersive element 16 is condensed by the second lens 17, on the respective mirror 21 of the mirror array 18, corresponding to each wavelength. A position at which the light is condensed on the mirror 21, in a case when the wavelengths of the connecting port 12*a* or the plurality of input ports of the group 12 are same, is a position of intersection of that light, and an X-coordinate of that position is expressed by the following expression (7).

$$X_{12a} = f_1 \tan(\beta_{12a} - \theta c) \qquad (7)$$

As shown in the abovementioned expression (7), the X-coordinate depends on a size of an output angle $\beta_{12}$, and the size of the output angle $\beta_{12}$, even when it is for the same wavelength, angles $\epsilon_{12}$, $\epsilon_{11}$, and $\epsilon_{10}$ being different mutually, differs from the size of $\beta_{10}$ and $\beta_{11}$.

$X_{12a}$ is a coordinate of a position on the mirror 20*a* at which the light is condensed, and coordinates $X_{12b}$, $X_{12c}$, $X_{12d}$, and $X_{12e}$ corresponding to the mirrors 20*b*, 20*c*, 20*d*, and 20*e* are expressed similarly as $X_{12a}$, by the abovementioned expression (7).

Moreover, a Y-coordinate, when a point at which the optical axis of the second lens 17 and the mirror array 18 intersect is let to be a center, can be calculated by the following expression (8), and a position at which the light is condensed by the second lens 17 differs according to the group, both for the X-coordinate and the Y-coordinate, as $\epsilon_{12}$, $\epsilon_{11}$, and $\epsilon_{10}$ differ mutually.

$$Y_{12} = f_1 \tan \epsilon_{12} \qquad (8)$$

Light of wavelengths from $\lambda_1$ to $\lambda_{18}$ which have been dispersed according to the wavelength by the dispersive element 16 are condensed at centers of corresponding mirrors 21*a* to 21*r* of the mirror array 18. The light which is condensed on the mirror is incident obliquely on a reflecting surface of the mirror, and is reflected in a direction different from the direction of incidence.

The light which has been reflected by the mirror 21 of the mirror array 18 enters the second lens 17 in the form of a light beam with a flare. The light of each wavelength which has entered the second lens 17, upon becoming collimated light, advances from the second lens 17 toward the dispersive element 16, and is incident to be inclined at an angle $\epsilon_{12}$ with respect to the first direction A1 (FIG. 8). When an angle of rotation of each mirror is the same, the light from the second lens 17 is condensed at one point on the dispersive element 16, and light reflected by the connecting port 12*a* and the plurality of input ports from the mirror array 18 of the group 12, at the time of being incident on the dispersive element 16, is incident at the same location as of the group 10 and the group 11 which are different groups.

The light which has been wavelength-multiplexed by the dispersive element 16 enters the first lens 15 maintaining the state of being collimated, and is condensed by the first lens 15. A position at which the light is condensed is a position of intersection of the light reflected by the connecting port 12*a* and the plurality of input ports from the mirror array 18 of the group 12, and this position is a position of intersection with an optical axis of a lens corresponding to the group 12, of the second lens array 14.

The light which has been condensed by the first lens 15 is collimated by the lens corresponding to the group 12, of the second lens array 14, and enters a lens of the first lens array 13 corresponding to the output port 12*e*. The light which has entered the lens of the first lens array 13 corresponding to the output port 12*e* is condensed at the output port 12*e*.

Figure 35:
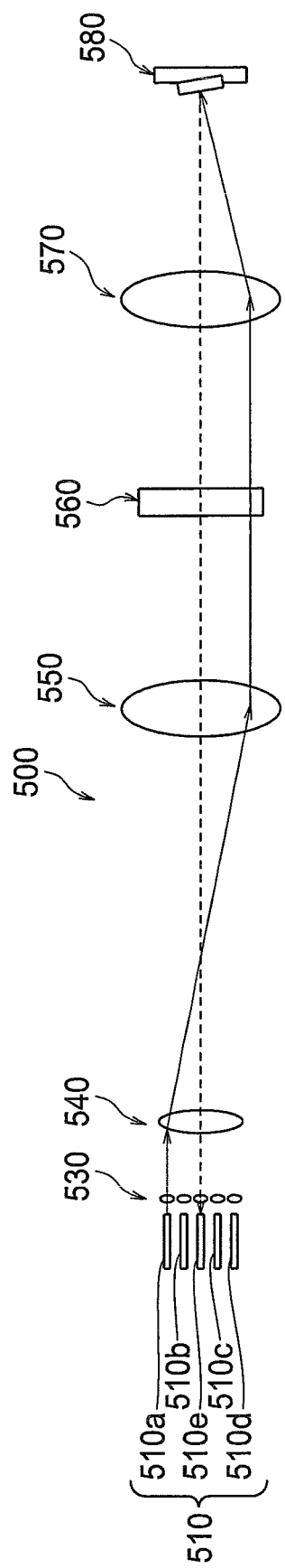
FIG. 35 is a side view showing a structure of a conventional wavelength selective switch.
Figure 36:
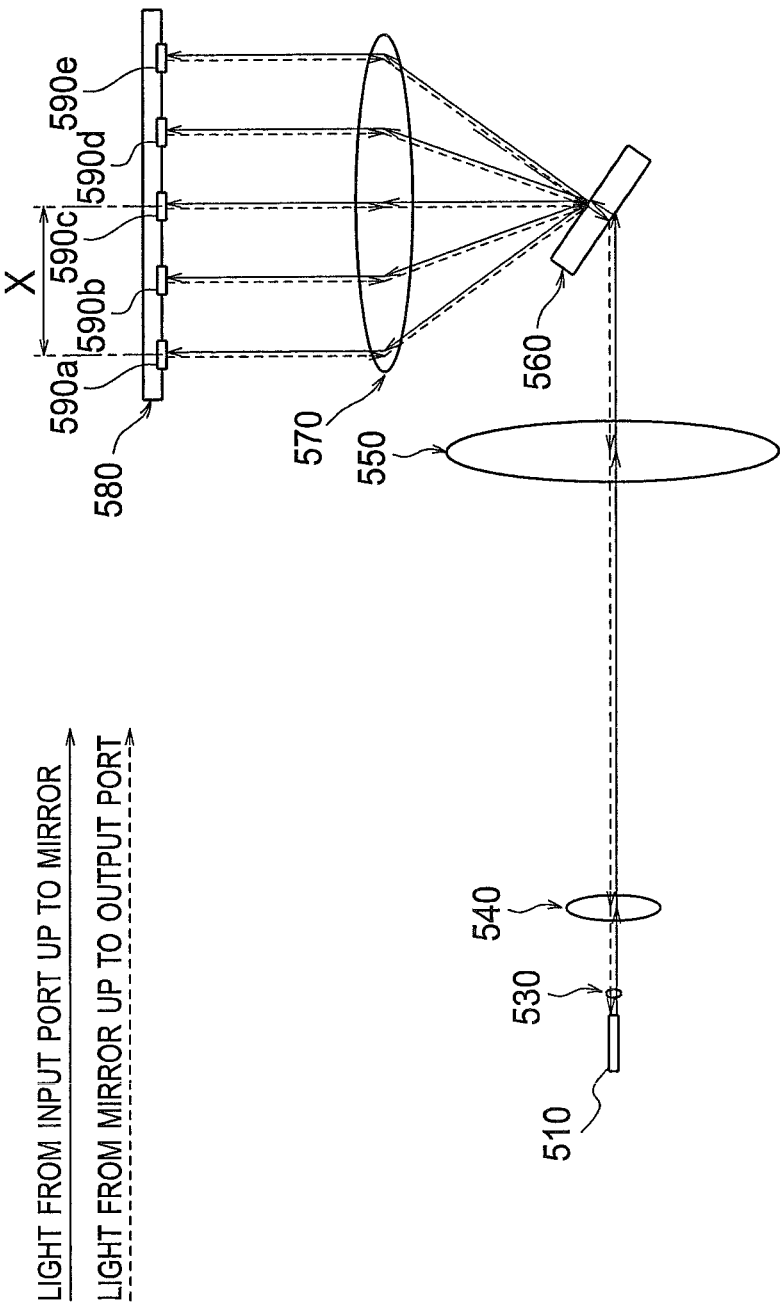
FIG. 36 is a top view showing the structure of the conventional wavelength selective switch.
Figure 37:
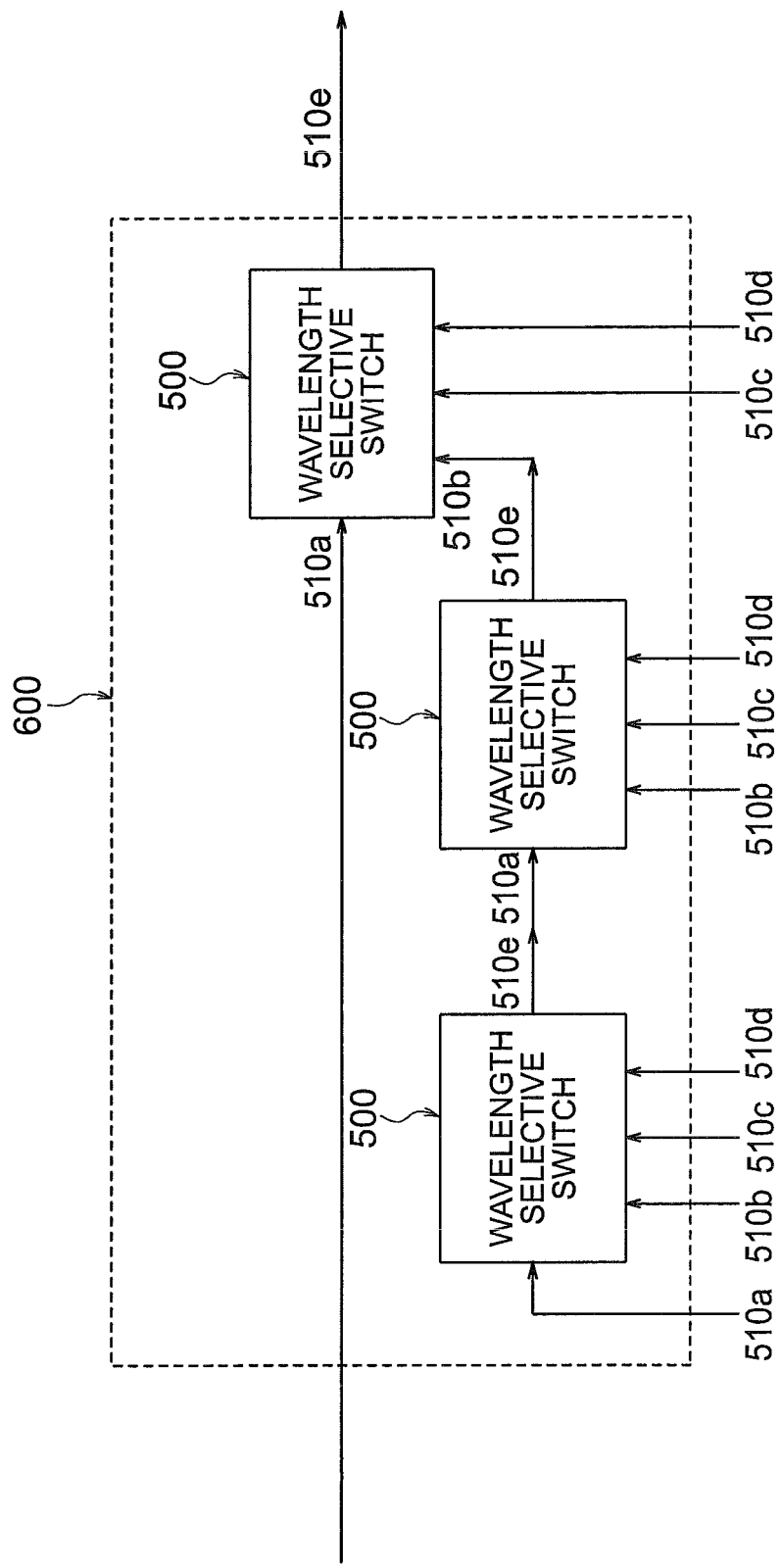
FIG. 37 is a block diagram showing a structure of a 10×1 wavelength selective switch of an ADD type.

By making such an arrangement, as compared to a case in which, a conventional wavelength selective switch 500 having a conventional structure as in FIG. 35 and FIG. 36 is let to be multiple-staged, it is possible to make the first lens 15, the dispersive element 16, and the second lens 17 common for all the groups, and to reduce the cost substantially. By making the first lens 15, the dispersive element 16, and the second lens 17 common, it is possible to shorten a time taken for assembling. Moreover, since it is possible to integrate the input ports, the output ports, the first lens array 13, and the second lens array 14 by making multiple-staged structure, it is possible to reduce the cost substantially.

(Second Embodiment)

For a wavelength selective switch 102 according to a second embodiment of the present invention, in the arrangement of the wavelength selective switch 101 according to the first embodiment shown in diagrams from FIG. 1 to FIG. 12, $|\epsilon_{10}|$ is let to be $|\epsilon_{12}|$ ($|\epsilon_{10}|=|\epsilon_{12}|$), and $\epsilon_{10}$ is selected such that $X_{11a} \ldots, X_{10b} \ldots,$ and $X_{12b}$ are same mutually. The rest of the arrangement is same as in the wavelength selective switch 101 according to the first embodiment. Same reference numerals are assigned to members which are same as in the first embodiment, and the description in detail of such members is omitted.

Figure 13:
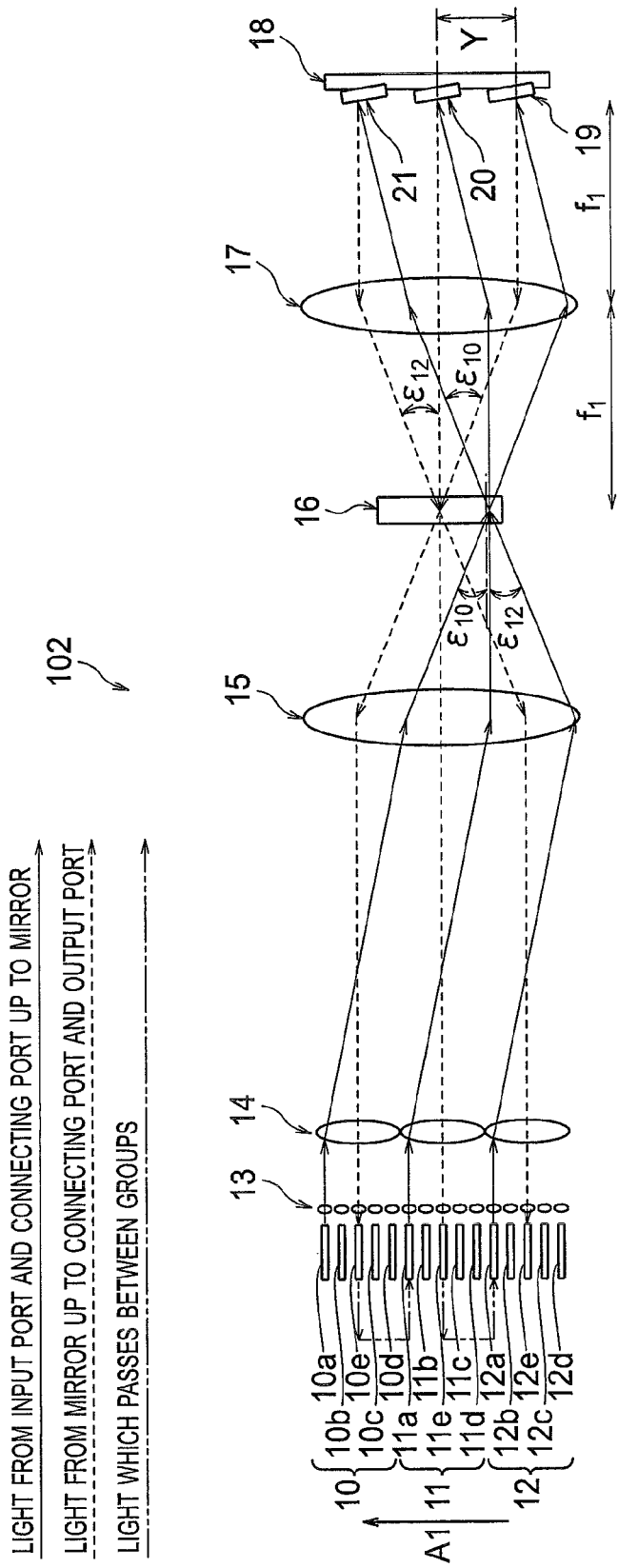
FIG. 13 is a side view showing a structure of a wavelength selective switch according to a second embodiment of the present invention.
Figure 14:
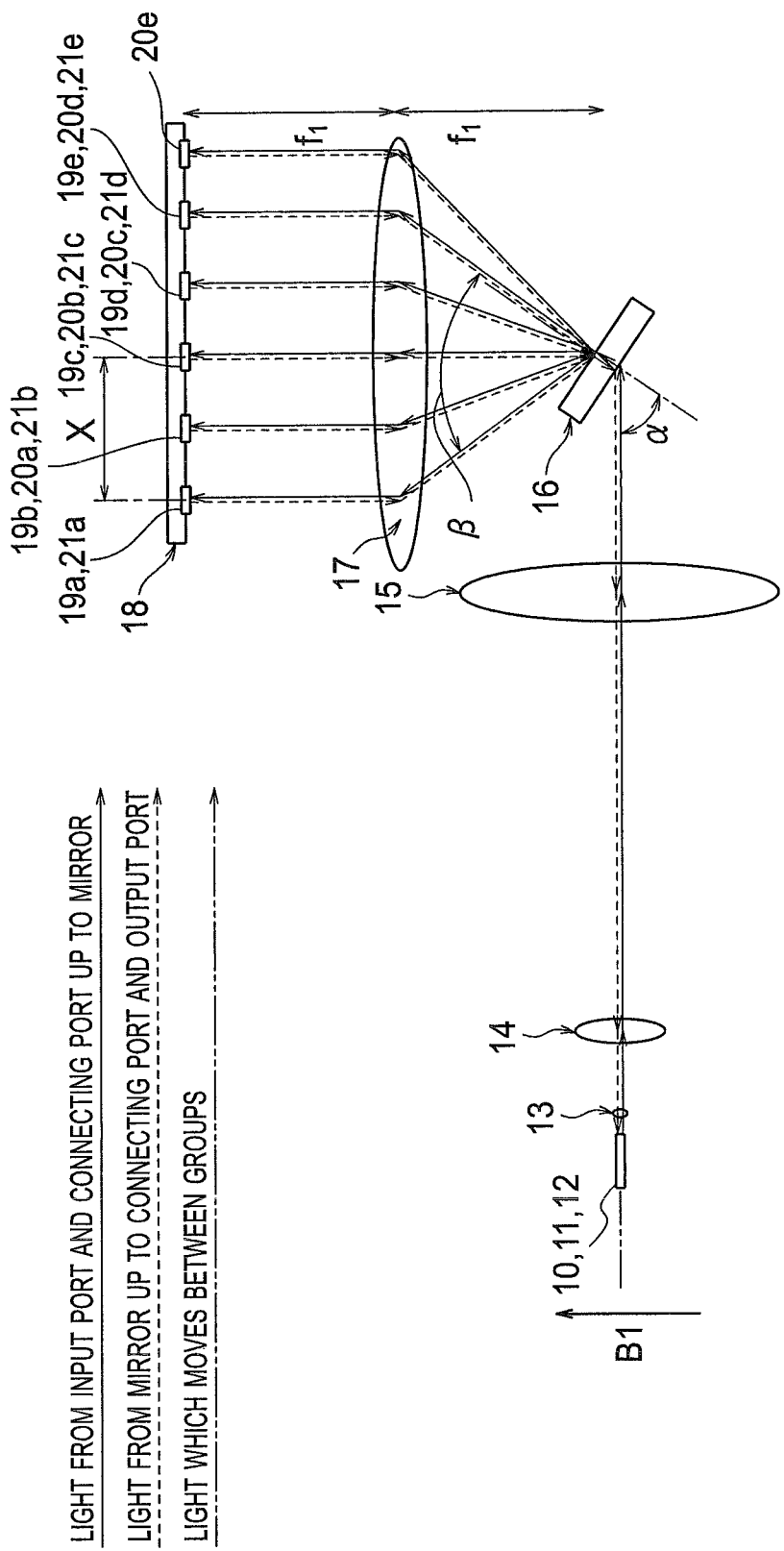
FIG. 14 is a top view showing the structure of the wavelength selective switch according to the second embodiment.
Figure 15:
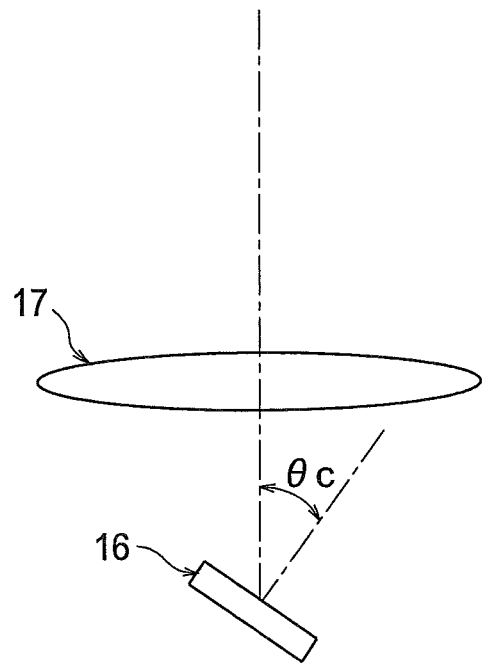
FIG. 15 is a diagram in which, the dispersive element and the second lens in FIG. 14 are shown in an enlarged form.

Here, FIG. 13 is a side view showing a structure of the wavelength selective switch 102. FIG. 14 is a top view showing the structure of the wavelength selective switch 102. FIG. 15 is a diagram in which, the dispersive element 16 and the second lens 17 are shown in an enlarged form. FIG. 13 shows a path of light since the light is input from the input port 10*a* till the light is condensed at the connecting port 10*e*, a path of light since light which has been condensed at the connecting port 10*e* is input from the connecting port 11*a* till the light is condensed at the connecting port 11*e*, and a path since the light which has been condensed at the connecting port 11e is input from the connecting port 12a, till the light is condensed at the output port 12e.

The light which has been input from the plurality of input ports of the group 10 is condensed in a state of the wavelengths separated, to the mirror array 18. For a position at which the light is condensed to be shifted by one wavelength as compared to the group 11, in the second direction B1, $\epsilon_{10}$ has been selected. In the second embodiment, for simplifying the description, a case in which the wavelength is shifted by one, or a case of $|\epsilon_{10}|=|\epsilon_{12}|$ will be described. However, the number of wavelengths to be shifted is not limited, and moreover, $|\epsilon_{10}|$ may not be equal to $|\epsilon_{12}|$ ($|\epsilon_{10}|\neq|\epsilon_{12}|$).

Concretely, the angle $\epsilon_{10}$ in the first direction A1, at which the wavelength-multiplexed light of the plurality of input ports of the group 10 is incident on the dispersive element 16 is expressed by the following expression (9).

$$\cos \epsilon_{10} = \lambda_{n+1}/\lambda_n \qquad (9)$$

provided that, $\lambda_{n+1} < \lambda_n$, and $\lambda_n$ is an arbitrary wavelength, and $\lambda_{n+1}$ is a wavelength when the wavelength is shifted by 1 from the arbitrary wavelength $\lambda_n$.

Figure 16:
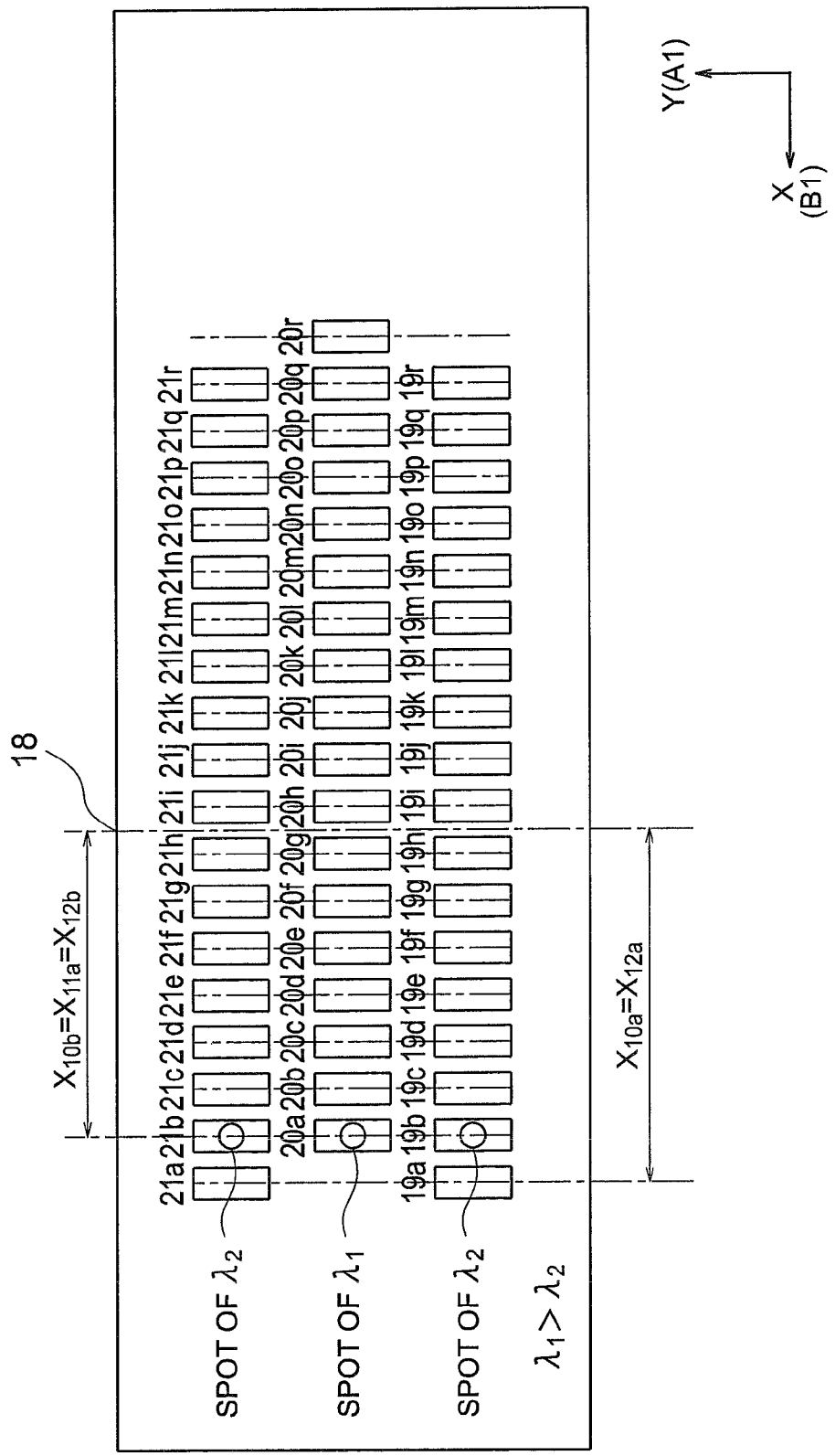
FIG. 16 is a plan view showing a structure of a mirror array and spot positions of light of wavelengths and $\lambda_1$ and $\lambda_2$ of groups 11 and 12 according to the second embodiment.

FIG. 16 is a plan view showing a structure of a mirror array and spot positions of light of wavelengths $\lambda_1$ and $\lambda_2$ of the groups 10, 11, and 12.

As shown in FIG. 16, a position in the second direction B1, of the light of the group 10 collected at the mirror array 18, when compared to a position in the second direction B1 of light of the group 11 for which the angle $\epsilon_{11}$ of the first direction in which the light is incident on the dispersive element 16 is zero, is condensed at the mirror array 18, is shifted toward a long-wavelength side by 1. Correspondingly, the mirrors 19a to 19r and the mirrors 21a to 21r are also shifted toward the long-wavelength side by 1. In other words, a position of a spot of wavelength $\lambda_2$ of the group 10 and the group 12, and a position of a spot of wavelength $\lambda_1$ of the group 11 are same positions with respect to the first direction A1 of the mirror array 18.

By making the abovementioned arrangement, since there ceases to be a difference in a mirror pitch of the mirror array 18, according to the group, it is possible to manufacture the mirror array 18 easily. Moreover, although the wavelength is shifted by 1, since the spots are aligned at the same positions in the second direction B1, assemblability is improved.

The rest of the structure, action, and effect are similar as in the first embodiment.

(Third Embodiment)

Figure 17:
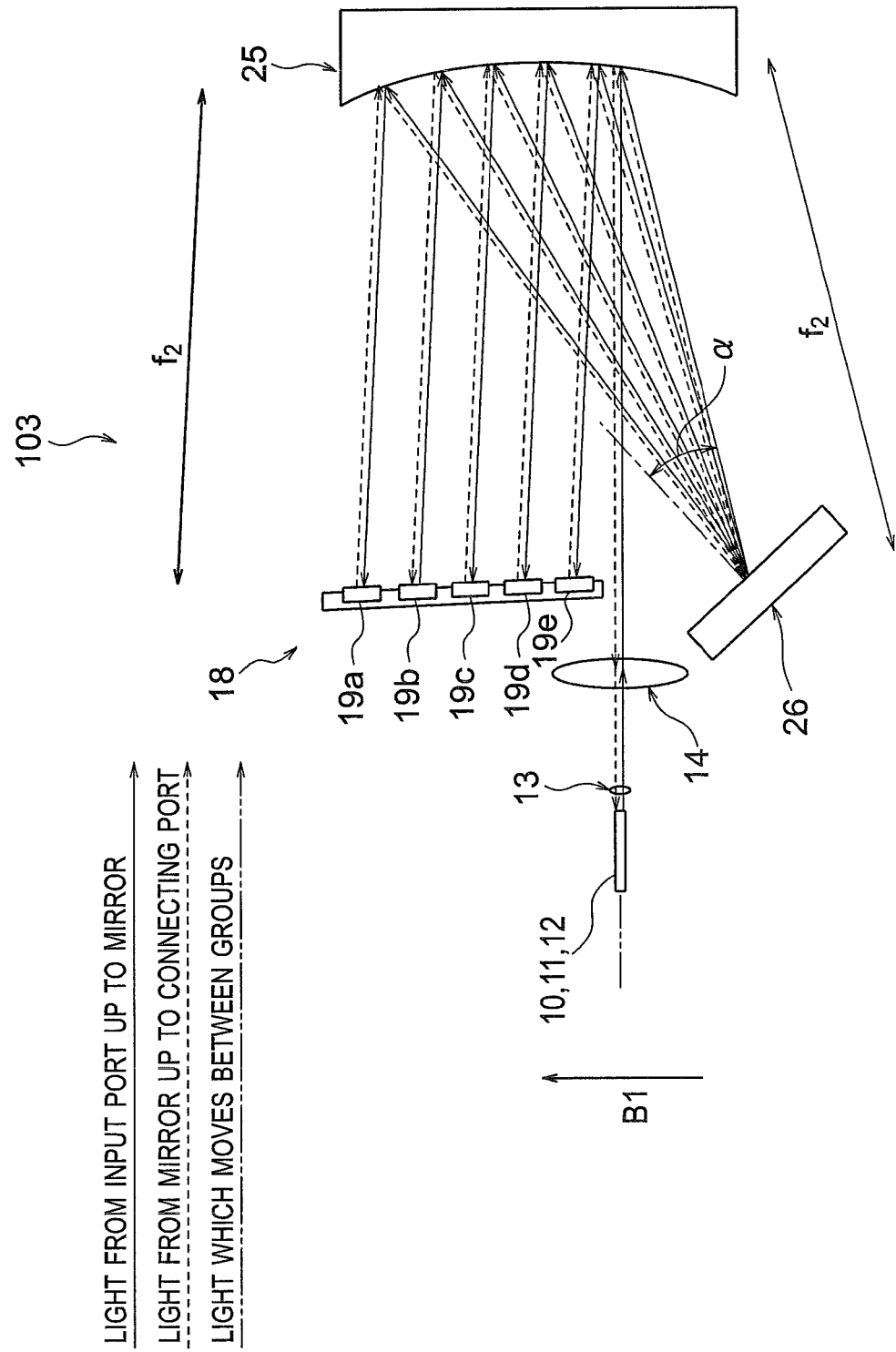
FIG. 17 is a top view showing a structure of a wavelength selective switch according to a third embodiment of the present invention.

FIG. 17 is a top view showing a structure of a wavelength selective switch 103 according to a third embodiment of the present invention.

The wavelength selective switch 103 is an application example when a reflecting lens 25 is used instead of the first lens 15 and the second lens 17 of the wavelength selective switch 101 according to the first embodiment shown in diagrams from FIG. 1 to FIG. 12. Moreover, a reflection dispersive element 26 is used instead of the dispersive element 16 of the first embodiment. The rest of the structure is similar to the structure of the wavelength selective switch 101 according to the first embodiment, and same reference numerals are used for members which are same as in the first embodiment.

In the wavelength selective switch 103 according to the third embodiment, for simplifying the description, the reflecting lens 25 has been used in common for the first lens 15 and the second lens 17. However, the use of the reflecting lens 25 is not restricted to the use in common. Moreover, the dispersive element 26 is shown with an example of a reflection dispersive element as in FIG. 17.

The reflecting lens 25 has a focal length $f_2$ and collimates a light beam having a flare, from the second lens array 14, and makes it incident on the dispersive element 26. Light which has been dispersed at an angle differing according to the wavelength, by the dispersive element 26 is condensed on a mirror corresponding to each wavelength, of the mirror array 18, by the reflecting lens 25.

Light which has been condensed on each mirror of the mirror array 18 is incident obliquely with respect to a reflecting surface of the mirror, and is reflected by the mirror in a direction different from the direction of incidence. Light which has been reflected by the mirror of the mirror array 18 enters the reflecting lens 25 in the form of a light beam having a flare. Light of each wavelength which has entered the reflecting lens 25, upon becoming collimated light, advances from the reflecting lens 25 toward the dispersive element 26, and is incident obliquely on the dispersive element 26. Light which has been wavelength-multiplexed by the dispersive element 26 enters the reflecting lens 25 while maintaining the collimated form, and is condensed by the reflecting lens 25. A position of light condensed is a position at which, light reflected by the plurality of input ports from the mirror array 18 of each group intersect, and this position differs according to the group.

Light which has been condensed by the reflecting lens 25 is collimated by a lens corresponding to the group, of the second lens array 14, and enters a lens of the first lens array 13 corresponding to the connecting port or the output port. Light which has entered the lens of the first lens array 13 corresponding to the connecting port or the output port is condensed at the connecting port or the output port.

The rest of the structure, action, and effect are similar as in the first embodiment.

(Fourth Embodiment)

Figure 18:
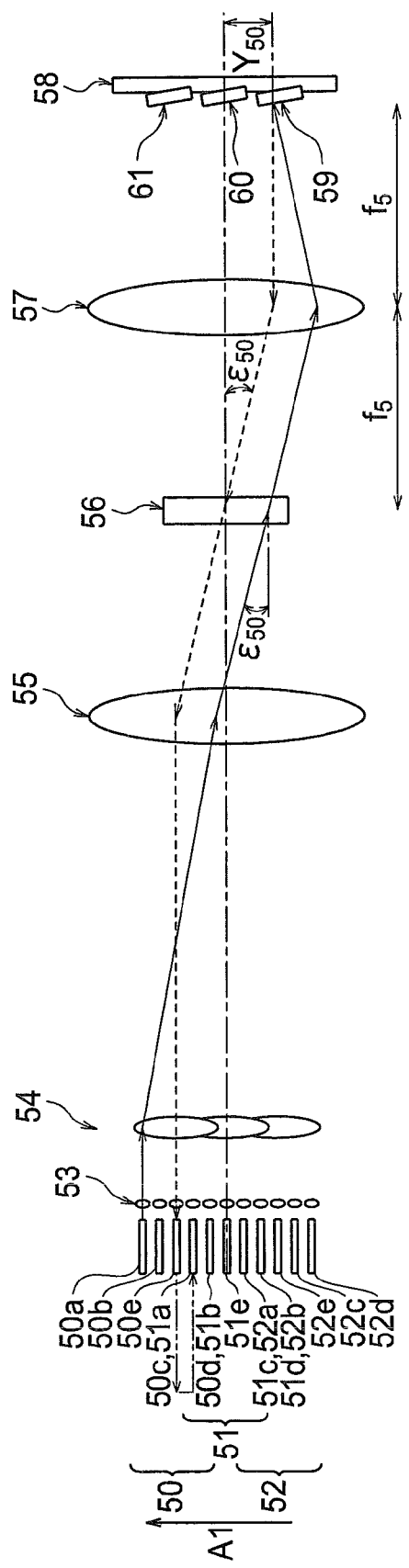
FIG. 18 is a side view showing a structure of a wavelength selective switch according to a fourth embodiment of the present invention.
Figure 19:
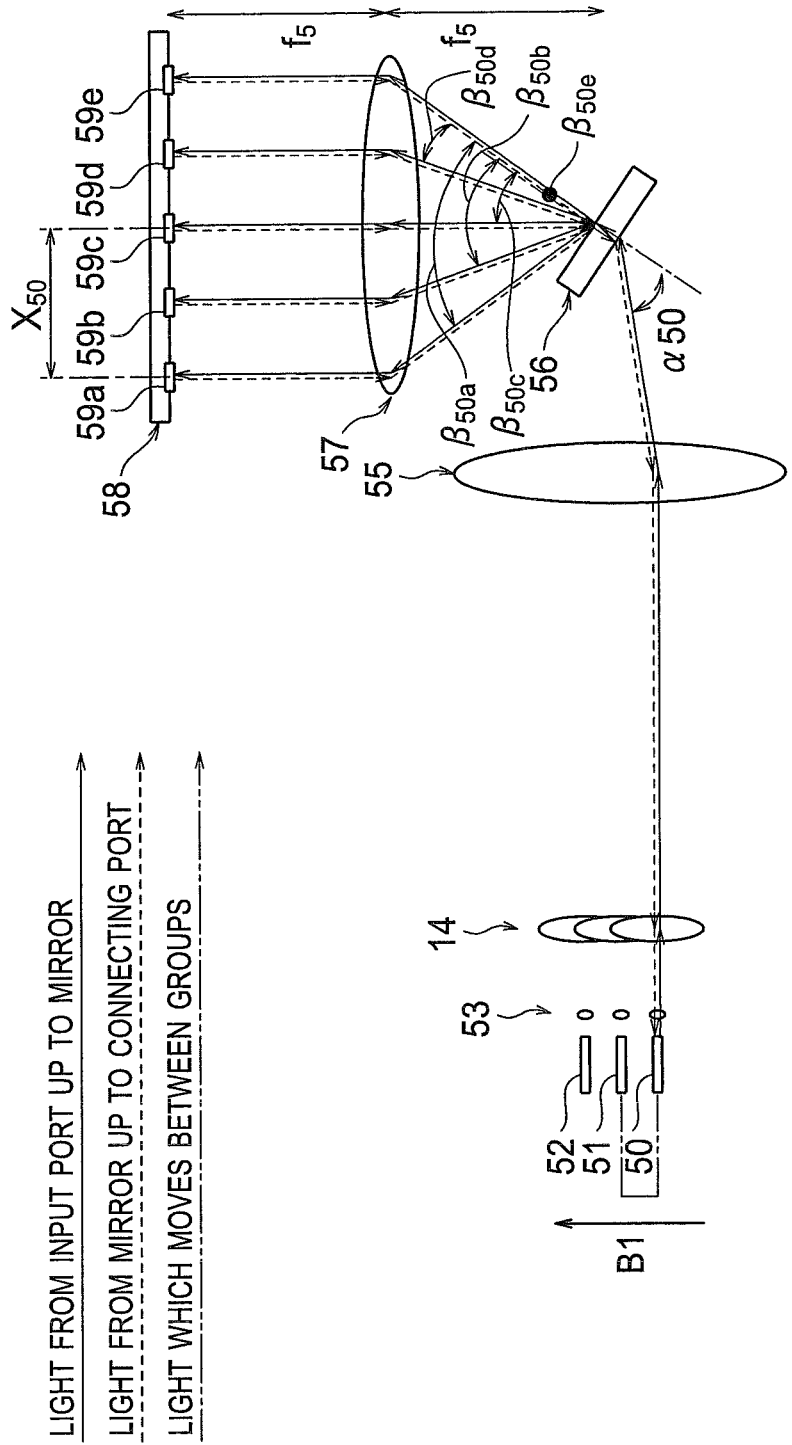
FIG. 19 is a top view showing the structure of the wavelength selective switch according to the fourth embodiment.
Figure 20:
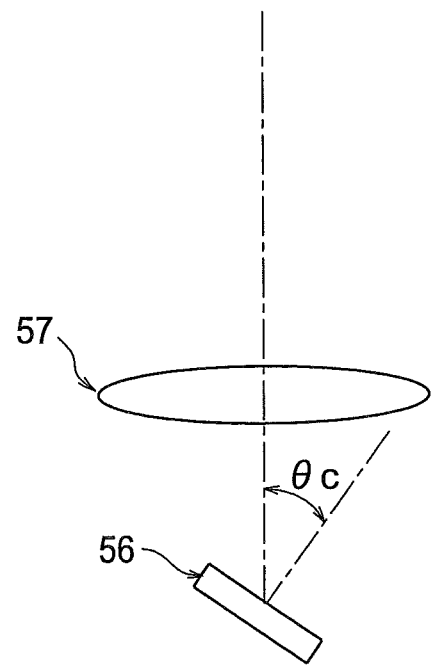
FIG. 20 is a diagram in which, a dispersive element and a second lens in FIG. 19 are shown in an enlarged form.
Figure 21:
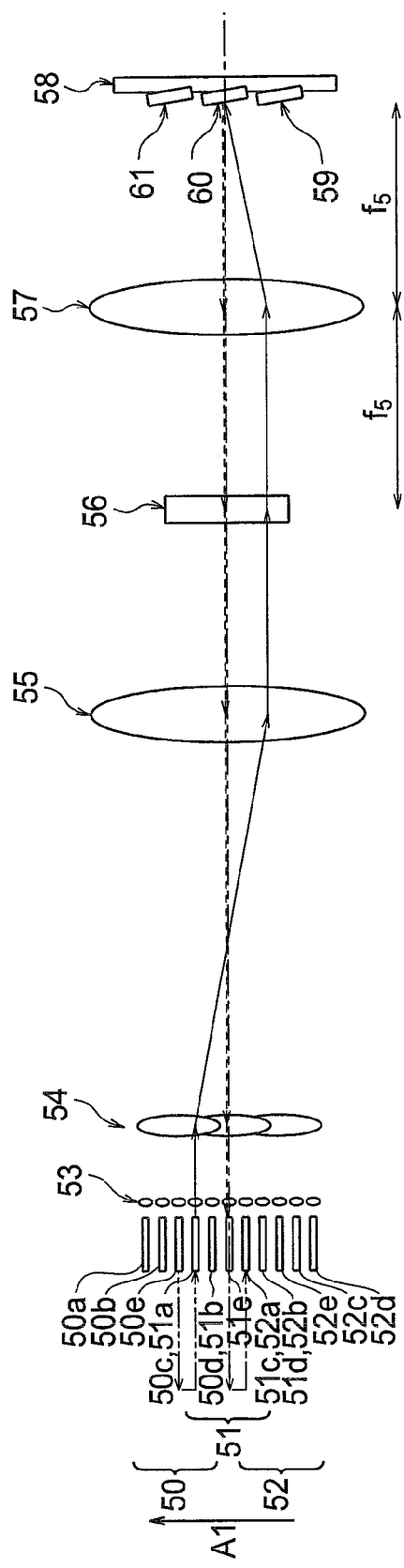
FIG. 21 is a side view showing the structure of the wavelength selective switch according to the fourth embodiment.
Figure 22:
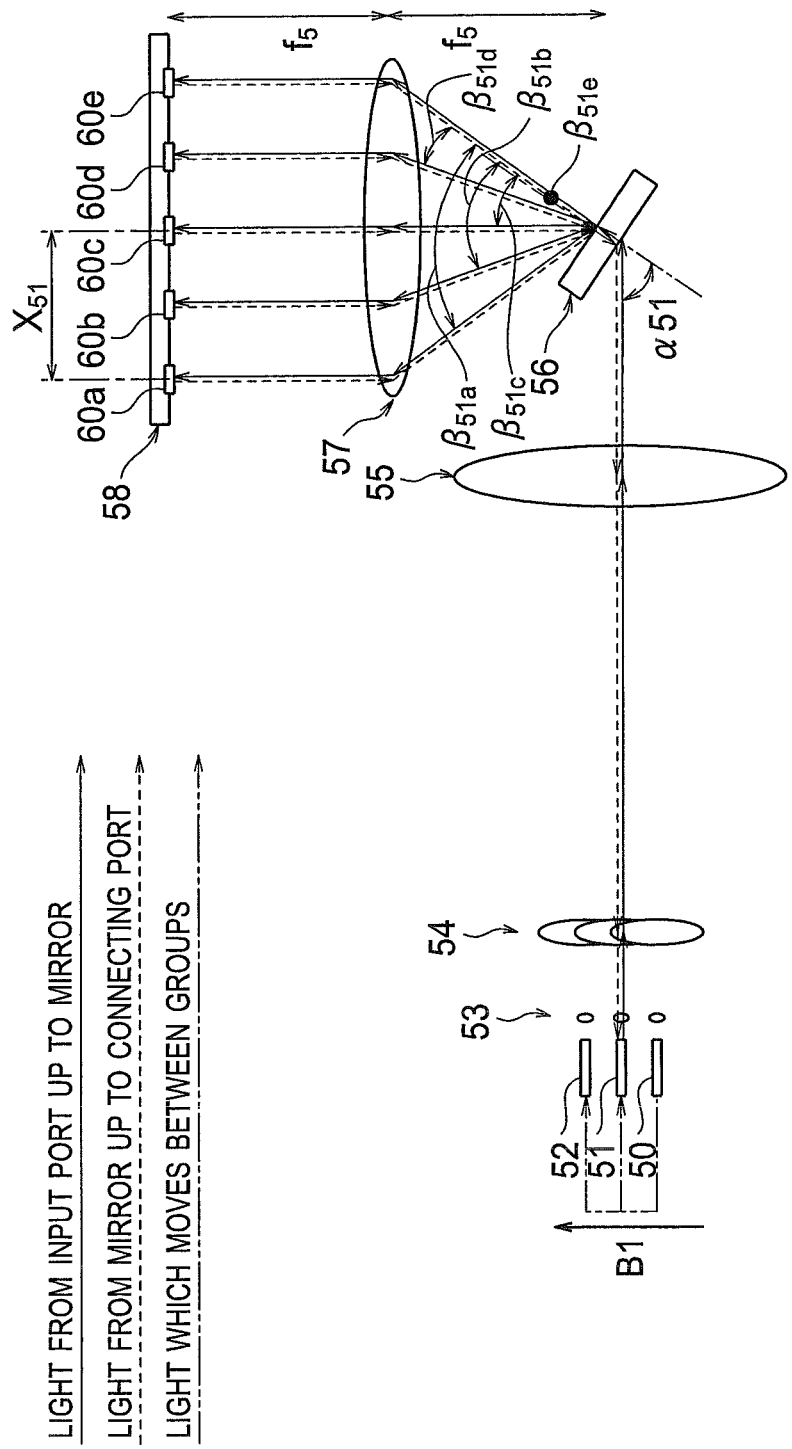
FIG. 22 is a top view showing the structure of the wavelength selective switch according to the fourth embodiment.
Figure 23:
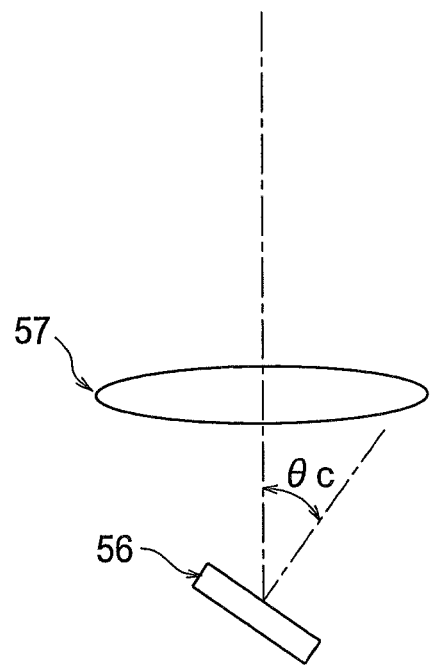
FIG. 23 is a diagram in which, a dispersive element and a second lens in FIG. 22 are shown in an enlarged form.
Figure 24:
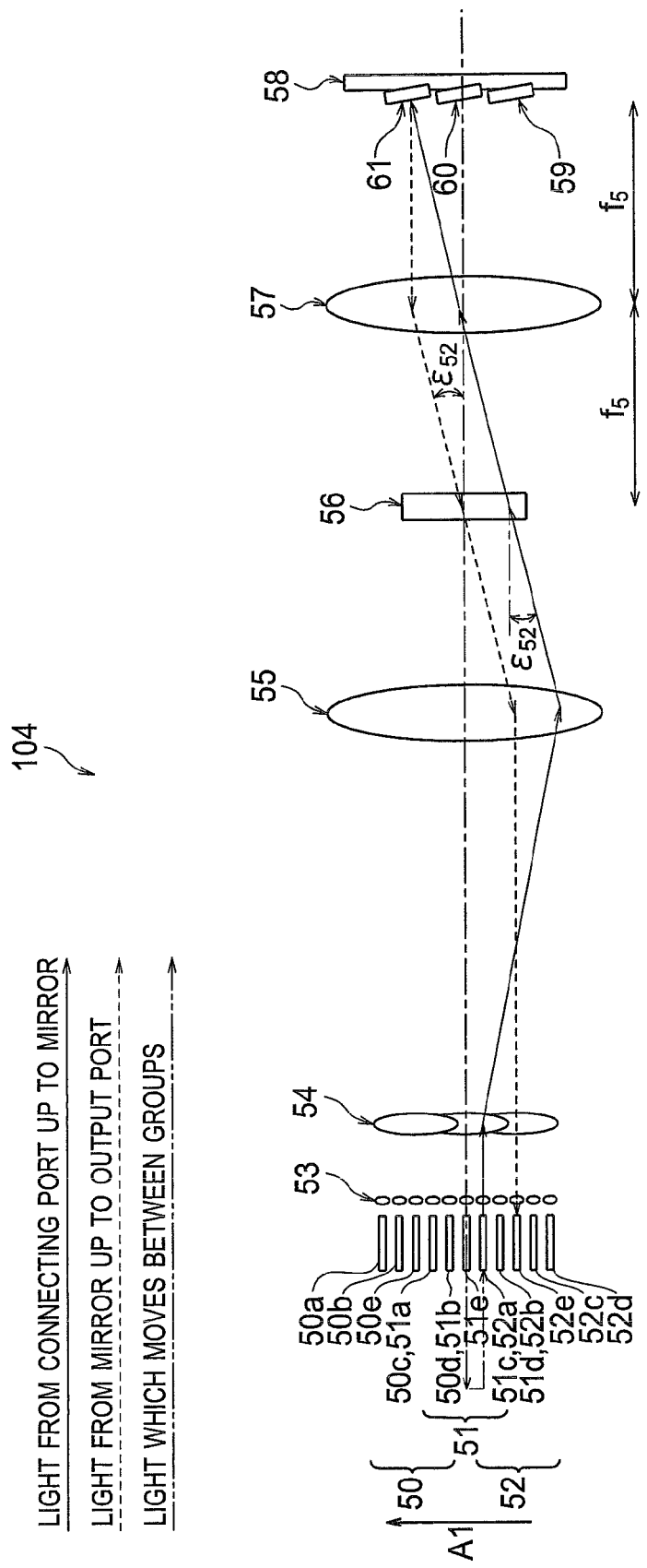
FIG. 24 is a side view showing the structure of the wavelength selective switch according to the fourth embodiment.
Figure 25:
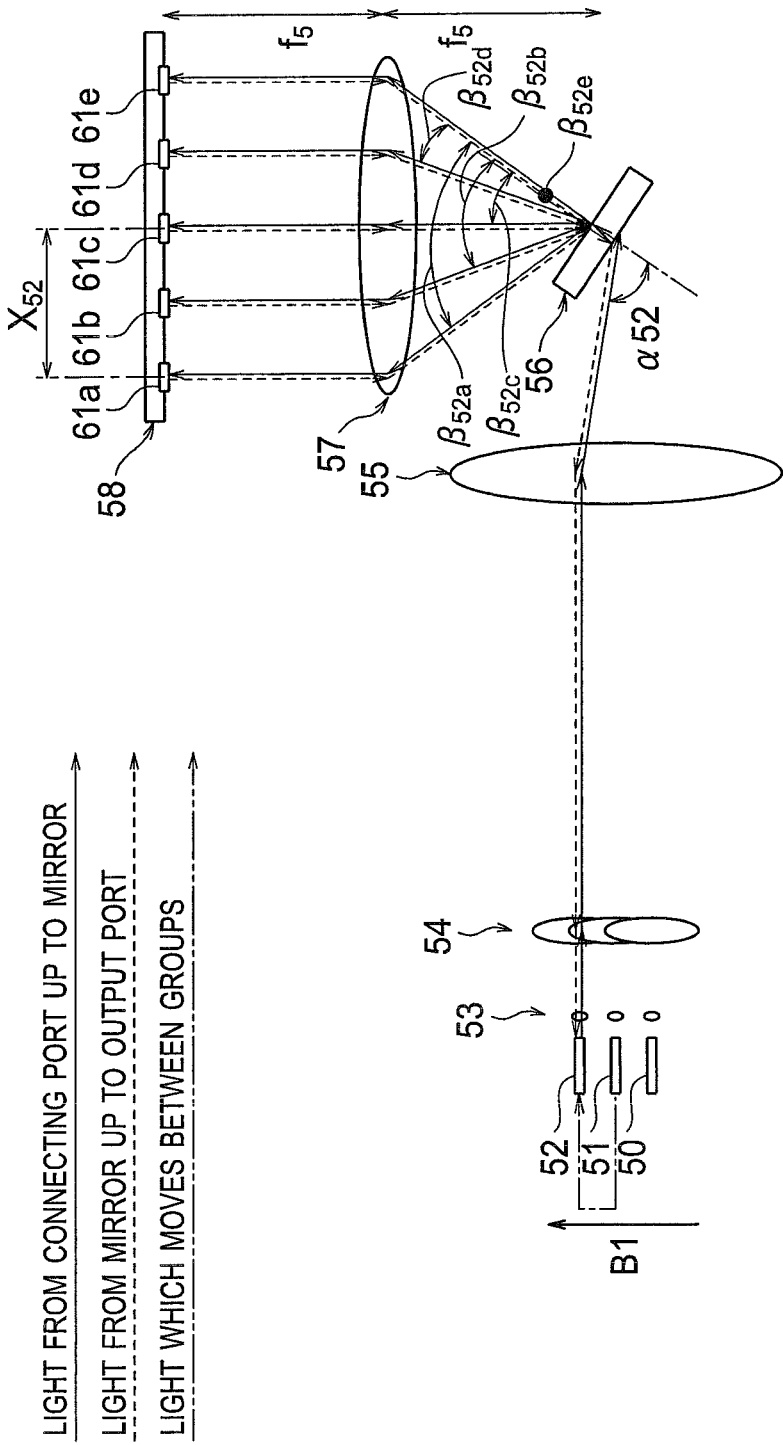
FIG. 25 is a top view showing the structure of the wavelength selective switch according to the fourth embodiment.
Figure 26:
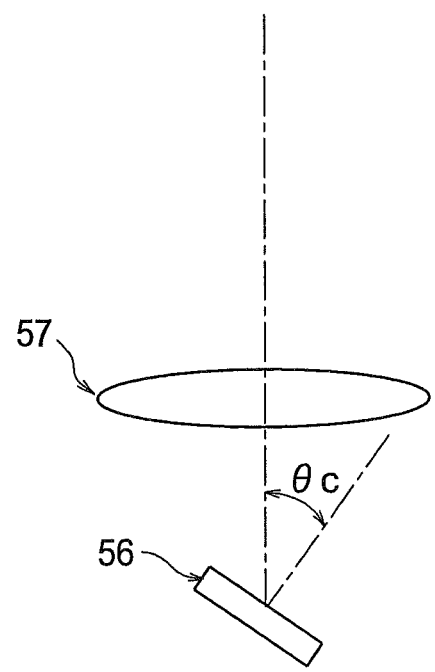
FIG. 26 is a diagram in which, a dispersive element and a second lens in FIG. 25 are shown in an enlarged form.

FIG. 18, FIG. 21, and FIG. 24 are side views showing a structure of a wavelength selective switch 104 according to a fourth embodiment of the present invention. FIG. 19, FIG. 22, and FIG. 25 are top views showing the structure of the wavelength selective switch 104. FIG. 20, FIG. 23, and FIG. 26 are diagrams in which, a dispersive element 56 and a second lens 57 in FIG. 19, FIG. 22, and FIG. 25 respectively, are shown in an enlarged form.

Diagrams from FIG. 18 to FIG. 26 show an optical path since light is input from an input port 50a till the light is condensed at a connecting port 50e. FIG. 21, FIG. 22, and FIG. 23 show an optical path since light which has been condensed at the connecting port 50e is input from a connecting port 51a till the light is condensed at a connecting port 51e. FIG. 24, FIG. 25, and FIG. 26 show an optical path since the light which has been condensed at the connecting port 51e is input from the connecting port 52a till the light is condensed at an output port 52e.

The wavelength selective switch 104 according to the fourth embodiment includes ten input ports 50a, 50b, 50c, 50d, 51b, 51c, 51d, 52b, 52c, and 52d, and the output port 52e. At an interior of the wavelength selective switch 104, the connecting port 50e of a group 50 and the connecting port 51a of a group 51 are connected mutually, and the connecting port 51e of the group 51 and the connecting port 52a of a group 52 are connected mutually. The output ports and the connecting ports are divided into the groups 50, 51, and 52. The groups 50, 51, and 52 are connected mutually by the connecting ports, and each group has at least one connecting port. Moreover, each of the groups 50, 51, and 52 form the input and output portion.

Figure 27:
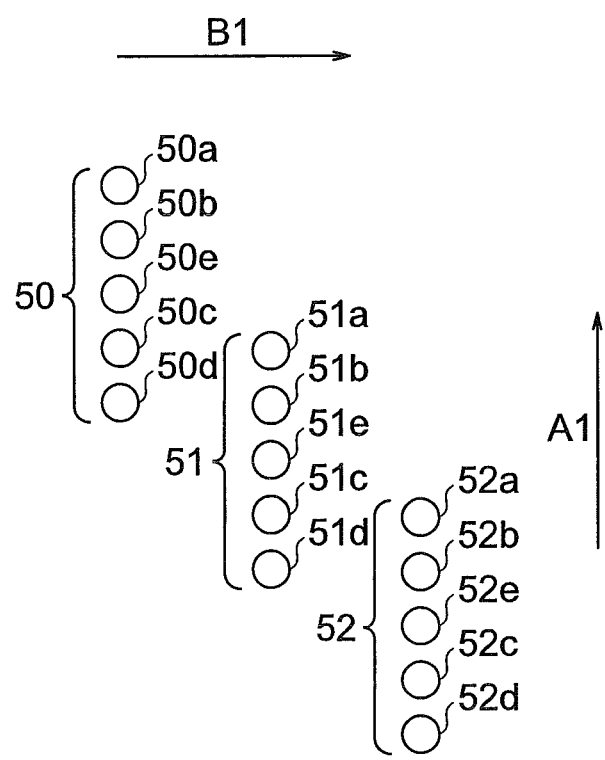
FIG. 27 is a front view as seen from a first lens array side, showing an arrangement of ports of groups 50, 51, and 52.

Moreover, the connecting ports, input ports, and output ports of each group are arranged in rows in an array form along the first direction A1 with the input port 50a, and the connecting ports 51a and 52a at the forefront. The input port 50a, and the connecting ports 51a and 52a which are at the forefront of the first direction of the respective groups are aligned to be shifted by three ports in the second direction B1 as shown in FIG. 27. FIG. 27 is a front view as seen from the first lens array 53 side, showing an arrangement of ports of the groups 50, 51, and 52.

Here, in the wavelength selective switch 104 according to the fourth embodiment, the port at the forefront of each group is shifted by three ports in the first direction A1. However, an amount of shifting and a direction of shifting are not restricted to the amount and the direction mentioned above. Moreover, in each group, an arrangement and the number of the connecting ports, the input ports, and the output ports are not restricted to the abovementioned arrangement and number.

An example in which light which has been input from the input port 50a is output to the output port 52e will be described below.

The light which has been input from the input port 50a is wavelength-multiplexed light of one or more than one wavelength, and the light which is output to the output port 52e is also wavelength-multiplexed light of one or more than one wavelength. A path of light from the input port 50a up to the output port 52e will be explained below by referring to diagrams from FIG. 18 to FIG. 26 upon dividing into three paths namely (1) a path from the input port 50a up to the connecting port 50e, (2) a path from the connecting port 51a up to the connecting port 51e, and (3) a path from the connecting port 52a up to the output port 52e.

The wavelength selective switch 104 has the plurality of input ports, output ports, and the connecting ports mentioned above, a first lens array 53, a second lens array 54, a first lens 55, the dispersive element 56, the second lens 57, and a mirror array 58. Wavelength-multiplexed light which has been input from the input port 50a advances toward the first lens array 53, and becomes collimated light by the first lens array 53, corresponding to the input port 50a. The first lens array 53 has lenses corresponding to the input ports, the output ports, and the connecting ports respectively. Moreover, in FIG. 18, FIG. 19, and FIG. 20, the light being input only to the input port 50a is shown in a simplified manner. However, practically, wavelength-multiplexed light is input from the plurality of input ports.

The input ports, the output ports, and the connecting ports are divided into three groups 50, 51, and 52. The groups 50, 51, and 52 are connected mutually by the connecting ports, and each group has at least one connecting port.

As shown in FIG. 27, the group 50 has a structure in which, the input ports 50a, 50b, 50c, and 50d, and the connecting port 50e are arranged at an equal interval along the first direction A1, with the connecting port 50e as a center. The group 51 has a structure in which, the connecting port 51a, the input ports 51b, 51c, and 51d, and the connecting port 51e are arranged at an equal interval along the first direction A1, with the connecting port 51e as a center. The group 52 has a structure in which, the connecting port 52e, the input ports 52b, 52c, and 52d, and the output port 52e are arranged at an equal interval along the first direction A1, with the output port 52e as a center.

Figure 28:
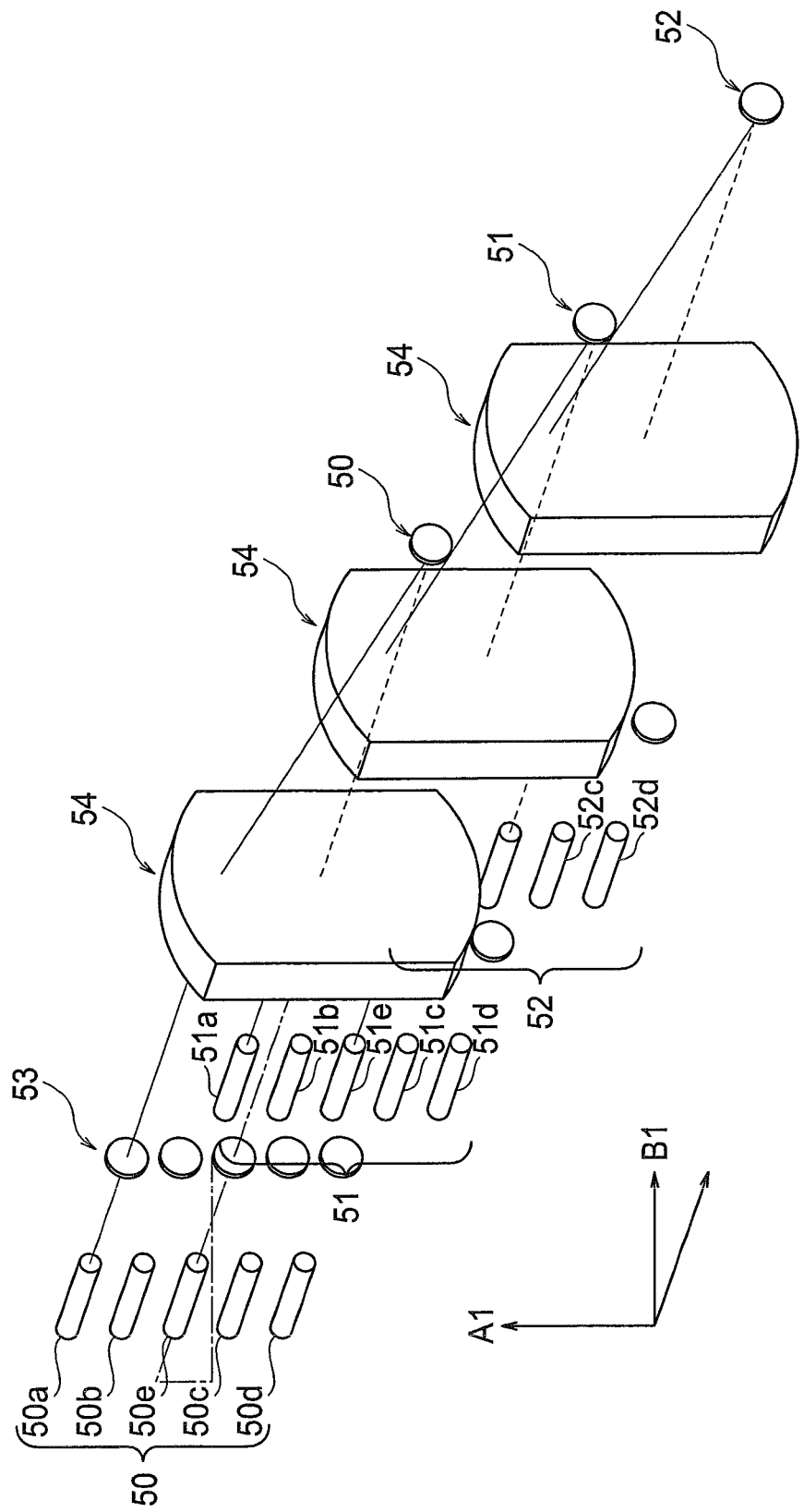
FIG. 28 is a perspective view showing an arrangement of input ports and output ports and connecting ports of each group, a first lens array, and a second lens array.

As shown in FIG. 18 and FIG. 19, light which has been collimated by a lens of the first lens array 53 is condensed by a lens corresponding to the group 50, of the second lens array 54. A position P50 of condensed light, as shown in FIG. 28, is a position at which, light of the plurality of input ports of the group 50 intersect. Moreover, for positions P51 and P52 at which the light is condensed by a lens of the second lens array 54 in the groups 51 and 52, light is condensed at positions differing from the position P50, in the first direction A1 and the second direction B1. An optical axis of the lens corresponding to the group 50, of the second lens array 54 intersects the position P50 at which the light is condensed, of the group 50. Here, FIG. 28 is a perspective view showing an arrangement of the input output ports and the connecting ports of each group, the first lens array 53, and the second lens array 54.

Light which has been condensed by the second lens array 54 enters the first lens 55 which is a lens common to all groups, in a state of a light beam having a flare, and upon being collimated by the first lens 55, is output toward the dispersive element 56. An optical axis of the lens corresponding to the group 50, of the second lens array 54, and an optical axis of the first lens 55 are at positions shifted in the first direction A1 and the second direction B1. Therefore, light beam which has been collimated by the first lens 55 is incident to be inclined by only $\epsilon_{50}$ in the first direction A1 and $\alpha_{50}$ in the second direction B1, with respect to the dispersive element 56 (FIG. 18 and FIG. 19).

Figure 29:
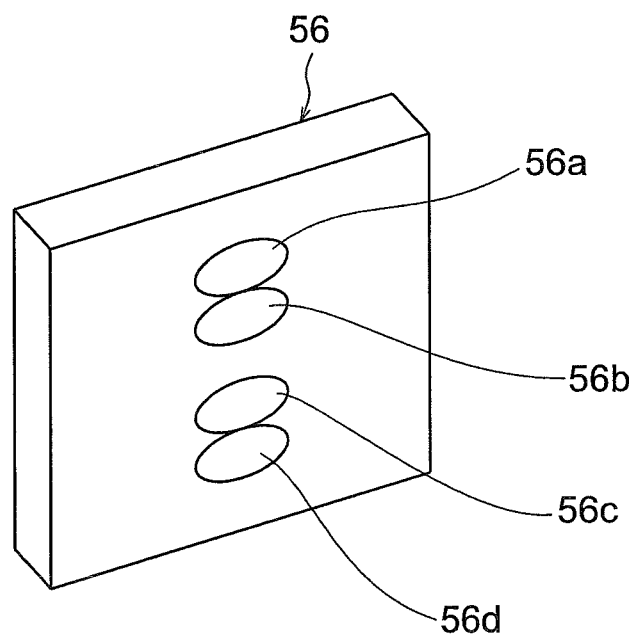
FIG. 29 is a perspective view showing spots which are formed by light which is incident on the dispersive element of the fourth embodiment.

Light which is incident on the dispersive element 56 from the plurality of input ports of the group 50 is incident as four spots 56a, 56b, 56c, and 56d for each input port as shown in FIG. 29. FIG. 29 is a perspective view showing spots which are formed by light incident on the dispersive element 56.

When seen for each group, light from the input ports of the group 51 and the group 52 which are different from the group 50, is incident on the spots 56a, 56b, 56c, and 56d. Concretely, light which is incident on the dispersive element 56 from the input port 50a and the connecting ports 51a and 52b is incident as the spot 56a, light which is incident on the dispersive element 56 from the input ports 50b, 51b, and 52b is incident as the spot 56b, light which is incident on the dispersive element 56 from the input ports 50c, 51c, and 52c is incident as the spot 56c, and light which is incident on the dispersive element 56 from the input ports 50d, 51d, and 52d is incident as the spot 56d.

For the dispersive element 56 which is to be used in the wavelength selective switch 104, an element having a structure of a normal diffractive grating is to be used. When an angle of incidence at which light beam from the first lens 55 enters the dispersive element 56 is let to be $\alpha_{50}$ (FIG. 19), an output angle $\beta_{50}$ at which, the light is dispersed by the dispersive element 56 is expressed by the following expression (10).

$$\sin \beta_{50a} = (m\lambda/d \cos \epsilon_{50}) - \sin \alpha_{50} \tag{10}$$

where,
m denotes an order of diffraction,
d denotes a pitch of the diffractive grating, and
$\lambda$ denotes a wavelength.

Output angles $\beta_{50b}$, $\beta_{50c}$, $\beta_{50d}$, and $\beta_{50e}$ are also expressed by expression (10), similarly as $\beta_{50a}$. Output angles $\beta_{50a}$, $\beta_{50b}$, $\beta_{50c}$, $\beta_{50d}$, and $\beta_{50e}$ are angles made by the second direction B1 with respect to a normal line of a launching surface of the dispersive element 56.

The dispersive element 56 disperses light which has been collimated by the first lens 55, in the second direction B1, at an angle which differs according to the wavelength. Dispersion of light only for five wavelengths is shown in FIG. 19 in a simplified manner. Wavelength-multiplexed light which enters the dispersive element 56 advances in the second direction B1, at the angles $\beta_{50a}$, $\beta_{50b}$, $\beta_{50c}$, $\beta_{50d}$, and $\beta_{50e}$ which are mutually different according to the wavelength.

A transmission dispersive element as in FIG. 18, FIG. 19, and FIG. 20 is shown as an example of the dispersive element 56. However, a reflection dispersive element may also be used as the dispersive element 56.

It is desirable that the second lens 57 is a lens in common for all the groups having a focal length $f_5$, and that the dispersive element 56 and the second lens 57 are separated only by the focal length $f_5$. This is because, when the dispersive element 56 and the second lens 57 are disposed at positions shifted from the focal length $f_5$, an angle of light of each wavelength output from the second lens 57 differs according to the wavelength. In other words, when a distance between the dispersive element 56 and the second lens 57 is let to be same as the focal length $f_5$, light output from the second lens 57 advances in a direction coinciding for each wavelength, and advances toward mirrors 59a, 59b, 59c, 59d, and 59e of the mirror array 58. Light of each wavelength dispersed by the dispersive element 56 is condensed on the mirror 59 (the mirrors 59a, 59b, 59c, 59d, and 59e) corresponding to respective wavelength of the mirror array 58, by the second lens 57.

A position of condensing on the mirror 59, when the wavelength of the plurality of input ports of the group 50 is same, is a position at which the light intersects. Furthermore, a position of condensing by the second lens 57 differs for each group. When $X_{50}$ and $Y_{50}$ are coordinates of a position at which light is condensed by the second lens 57 when a point at which, an optical axis of the second lens 57 and the mirror array 58 intersect is let to be a center, when $Y_{50}$ is let to be a coordinate of the first direction A1 and $X_{50}$ is let to be a coordinate in the second direction B1, the coordinates $X_{50}$ and $Y_{50}$ are expressed by the following expressions (11) and (12) respectively.

$$X_{50a} = f_5 \tan(\beta_{50a} - \theta c) \quad (11)$$

$$Y_{50} = f_5 \tan \epsilon_{50} \quad (12)$$

where,

θc denotes an angle made by the optical axis of the second lens 57 and a normal line of the dispersive element 56 as shown in FIG. 20.

$X_{50a}$ is a coordinate of a position on the mirror 59a at which the light is condensed, and $X_{50b}$, $X_{50c}$, $X_{50d}$, and $X_{50e}$ corresponding to the mirrors 59b, 59c, 59d, and 59e are expressed by the abovementioned expression (11) similarly as $X_{50a}$.

Figure 30:
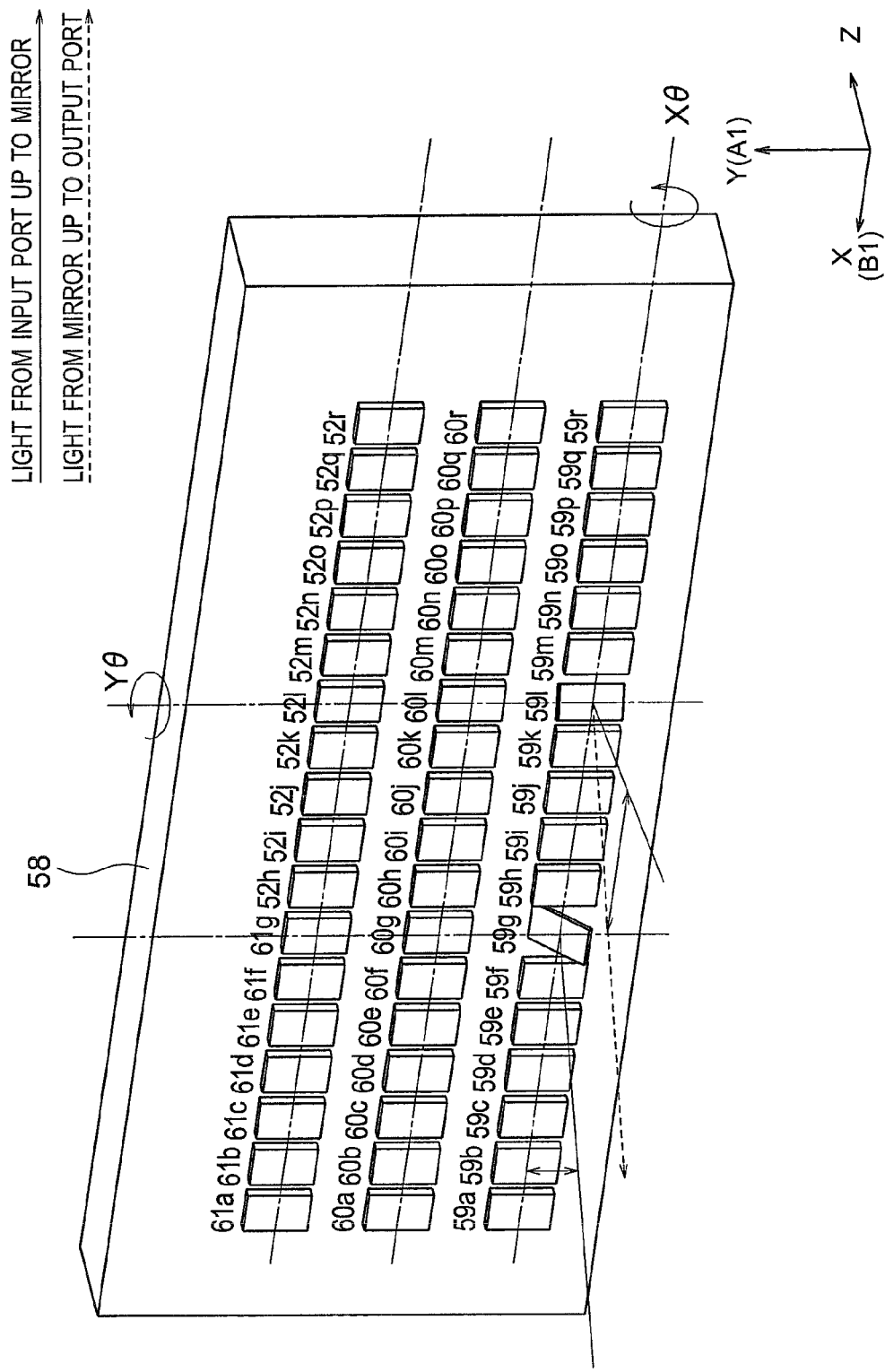
FIG. 30 is a perspective view as seen from a second-lens side, showing a structure of a mirror array of the fourth embodiment.

In the wavelength selective switch 104, the number of mirror arrays same as the number of groups is arranged in a row in the first direction A1 such that, at least the position at which the light is condensed by the second lens 57 differs according to the group. Concretely, the mirror array 58, as shown in FIG. 30, has a plurality of mirrors arranged in a row, with the number of mirrors same as at least the number of wavelengths in the second direction B1, same as at least the number of groups in the first direction A1. Here, FIG. 30 is a perspective view as seen from the second lens 57 side, showing a structure of the mirror array 58. In the mirror array 58, each mirror is capable of rotating around Xθ which rotates around an X-axis as a center, and Yθ which rotates around Y-axis as a center. Here, X-axis corresponds to the second direction B1 and Y-axis corresponds to the first direction A1.

Light of each of wavelengths $\lambda_1$ to $\lambda_{18}$ of the group 10, dispersed according to the wavelength by the dispersive element 56 is condensed at a center of corresponding mirrors 59a to 59r respectively. Light which is condensed on the mirror is incident obliquely on a reflecting surface of the mirror, and is reflected by the mirror in a direction different from a direction of incidence.

Light which has been reflected by the mirror 59 of the mirror array 58 enters the second lens 57 in the form of a light beam having a flare. Light of each wavelength which has entered the second lens 57 becomes collimated light and advances from the second lens 57 to the dispersive element 56, and is incident obliquely at $\epsilon_{50}$ with respect to the first direction A1 of the dispersive element (FIG. 18). When an angle of rotation of each mirror is same, the light from the second lens 57 is condensed at one point on the dispersive element 56, and light reflected by the mirror array 58 which has been input from a plurality of input ports of the group 50 at the time of being incident on the dispersive element 56 is incident at a same location as of reflected light of the group 51 and group 52 which are different groups.

Light which has been wavelength-multiplexed by the dispersive element 56 enters the first lens 55 maintaining the collimated form, and is condensed by the lens 55. A position of light condensed is a position at which, light reflected by the mirror array 58 intersect, and that position is a position of intersection with an optical axis of a lens corresponding to the group 50, of the second lens array 54.

Light which has been condensed by the first lens 55 is collimated by a lens corresponding to the group 10, of the second lens array 54, and enters a lens corresponding to the connecting port 50e, of the first lens array 53. A position at which, the light is condensed by the first lens 55 intersects with an optical axis of the second lens array 54, corresponding to the group 50. Light which has entered the lens of the first lens array 53 corresponding to the connecting port 50e is condensed at the connecting port 50e (FIG. 18).

The connecting port 50e and the connecting port 51a are connected mutually. Accordingly, light having wavelengths combined or separated at the group 50 becomes a wavelength-multiplexed light of one or more than one wavelength, and advances from the connecting port 51a of the group 51 toward the first lens array 53, and becomes light collimated by the lens of the first lens array 53 corresponding to the connecting port 51a (FIG. 21).

As shown in FIG. 21 and FIG. 22, light which has been collimated by the lens of the first lens array 53 is condensed by a lens corresponding to the group 51, of the second lens array 54. A position at which the light is condensed is a position at which, light of the connecting port 51a and the plurality of input ports of the group 51 intersect. Moreover, the position at which, the light is condensed intersects with an optical axis of the lens corresponding to the group 51, of the second lens array 54. A position at which, the light is condensed of each lens of the second lens array 54 is a position which differs according to the group.

Light which has been collimated by the second lens array 54 enters the first lens 55 which is a common lens for all the groups, in the form of a light beam having a flare, and upon being collimated by the first lens 55, is output toward the dispersive element 56. An optical axis of the lens of the first lens array 54 corresponding to the group 51, and the optical axis of the first lens 55 coincide, and light from the first lens 55 is incident at right angles to the first direction A1 with respect to the dispersive element 56 (FIG. 21) and is incident to be inclined at an angle $\alpha_{51}$ with respect to the second direction B1 (FIG. 22). Light which is incident on the dispersive element 56 from the connecting port 51a and the plurality of input ports of the group 51 is incident on the same location as of light from the other ports corresponding to the group 50 and the group 52.

The dispersive element 56 disperses the light which has been collimated by the first lens 55 in the second direction B1, at an angle which differs according to the wavelength. An angle of incidence of light on the dispersive element 56 from the connecting port 51a and the plurality of input ports of the group 51 being a right angle ($\epsilon_{51}$=0) with respect to the first direction A1, an output angle $\beta_{51}$ at which, the light is dispersed by the dispersive element 56 is to be calculated by the following conditional expression (13).

$$\sin \beta_{51a} = (m\lambda/d) - \sin \alpha_{51} \quad (13)$$

Output angles $\beta_{51b}$, $\beta_{51c}$, $\beta_{51d}$, and $\beta_{51e}$ are also expressed similarly as $\beta_{11a}$, by the abovementioned expression (13). The output $\beta_{51a}$, $\beta_{51b}$, $\beta_{51c}$, $\beta_d$, and $\beta_{51e}$ are angles made by the second direction B1 with respect to a normal line of a surface of the dispersive element 56 from which the light is launched.

The wavelength-multiplexed light which is incident on the dispersive element 56 advances in the second direction B1, at an angle which differs according to each wavelength, and even when the angle is for the same wavelength, the angle differs from a case of the group 50. The manner in which the light is dispersed is shown only for five wavelengths in FIG. 22 in a simplified manner.

The second lens 57 is a lens common to all groups having a focal length $f_5$. The dispersive element 56 and the second lens 57 being separated only by a distance same as the focal length $f_5$, the light launched from the second lens 57 advances in a direction which coincides for each wavelength, or in other words, in a direction toward a mirror 60 of the mirror array 58. Light of each wavelength which has been dispersed by the dispersive element 56 is condensed by the second lens 57, on the respective mirror 60 of the mirror array 58, corresponding to each wavelength.

A position at which, the light is condensed on the mirror 60, in a case when the wavelengths of the connecting port 51a and the plurality of input ports of the group 51 are same, is a position of intersection of that light, and this position is expressed by the following expression (14).

$$X_{51a} = f_5 \tan(\beta_{51a} - \theta c) \quad (14)$$

$X_{51a}$ is a coordinate of a position on the mirror 59a, at which the light is condensed, and coordinates $X_{51b}$, $X_{51c}$, $X_{51d}$, and $X_{51e}$ corresponding to the mirrors 59b, 59c, 59d, and 59e are expressed similarly as $X_{51a}$, by the abovementioned expression (14).

As shown in the abovementioned expression (14), the X-coordinate depends on a size of an output angle $\beta_{51}$ of light from the dispersive element 56, and the size of the output angle $\beta_{51}$, even when it is the same wavelength, differs from the size of the output angle $\beta_{50}$ for the group 50. Moreover, an angle at which, the light is incident from the connecting port 51a on the dispersive element 56 being a right angle with respect to the first direction A1 ($\epsilon_{51}$=0), coordinate $Y_{51}$ in the first direction A1 of the position at which the light is condensed becomes $Y_{51}$=0. Consequently, the position at which the light is condensed by the second lens 57 differs from a case of the group 50 for both the X-coordinate and the Y-coordinate.

Light of wavelengths from $\lambda_1$ to $\lambda_{18}$ which have been dispersed according to the wavelength by the dispersive element 56 are condensed at centers of corresponding mirrors 60a to 60r of the mirror array 58. The light which is condensed on the mirror is incident obliquely on a reflecting surface of the mirror, and is reflected in a direction different from the direction of incidence. The mirrors 60a to 60r are disposed such that positions thereof in the first direction A1 intersect the optical axis of the second lens 57.

The light which has been reflected by the mirror 60 of the mirror array 58 enters the second lens 57 in the form of a light beam with a flare. The light of each wavelength which has entered the second lens 57, upon becoming collimated light, advances from the second lens 57 toward the dispersive element 56, and is incident at right angles with respect to the first direction A1 of the dispersive element 56 (FIG. 21). When an angle of rotation of each mirror is the same, the light from the second lens is condensed at one point on the dispersive element 56, and light reflected from the mirror array 58, which has been input from the connecting port 51a and the plurality of input ports of the group 51, at the time of being incident on the dispersive element 56 is incident at the same location as of the group 50 and the group 52 which are different groups.

The light which has been wavelength-multiplexed by the dispersive element 56 enters the first lens 55 maintaining the state of being collimated, and is condensed by the first lens 55. A position at which the light is condensed is a position of intersection of the light reflected by the connecting port 51a and the plurality of input ports from the mirror array 58 of the group 51, and this position is a position of intersection with an optical axis of a lens corresponding to the group 51, of the second lens array 54.

The light which has been condensed by the first lens 55 is collimated by the lens corresponding to the group 51, of the second lens array 54, and enters the lens of the first lens array 53, corresponding to the connecting port 51e. The light which has entered the lens of the first lens array 53 corresponding to the connecting port 51e is condensed at the connecting port 51e.

The connecting port 51e and the connecting port 52a are connected mutually. Accordingly, light having wavelengths combined or separated at the group 51 becomes wavelength-multiplexed light of one or more than one wavelength, and advances from the connecting port 52a of the group 52 toward the first lens array 53, and becomes light collimated by the lens of the first lens array 53 corresponding to the connecting port 52a (FIG. 24).

The light which has been collimated by the lens of the first lens array 53 is condensed by a lens corresponding to the group 52, of the second lens array 54. A position at which the light is condensed is a position of intersection of light of the connecting port 52a and the plurality of input ports of the group 52. Moreover, this position at which the light is condensed intersects an optical axis of the lens corresponding to the group 52, of the second lens array 54, and differs according to the group.

The light which has been condensed by the second lens array 54 enters the first lens 55 which is a lens common for all the groups, in the form of a light beam with a flare, and upon being collimated by the second lens 55, is output toward the dispersive element 56. An optical axis of the lens corresponding to the group 52, of the second lens array 54 and the optical axis of the first lens 55 are positions shifted in the first direction A1 and the second direction B1. Therefore, the light which has been collimated by the first lens 55 is incident to be inclined by an angle $\epsilon_{52}$ in the first direction A1, and by an angle $\alpha_{52}$ in the second direction B1, with respect to the dispersive element 56 (FIG. 24 and FIG. 25). The light which is incident on the dispersive element 56 from the connecting port 52a and the plurality of input ports of the group 52, as shown in FIG. 29, is incident on the same location of light from the group 50 and the group 51 which are different groups.

The dispersive element 56 disperses the light which has been collimated by the first lens 55 in the second direction B1, at an angle which differs according to the wavelength. An angle of incidence of light on the dispersive element 56 from the connecting ports 52a and the plurality of input ports of the group 52 being inclined only by the angle $\epsilon_{52}$ with respect to the first direction A1, an output angle $\beta_{52}$ at which, the light is dispersed by the dispersive element 56 is to be calculated by the following conditional expression (15).

$$\sin \beta_{52a} = (m\lambda/d \cos \epsilon_{52}) - \sin \alpha_{52} \quad (15)$$

Output angles $\beta_{52b}$, $\beta_{52c}$, $\beta_{52d}$, and $\beta_{52e}$ are also expressed similarly as $\beta_{52a}$, by the abovementioned expression (15). The output angles $\beta_{52a}$, $\beta_{52b}$, $\beta_{52c}$, $\beta_{52d}$, and $\beta_{52e}$ are angles made by the second direction B1 with respect to a normal line of a surface of the dispersive element 56 from which the light is launched.

The wavelength-multiplexed light which enters the dispersive element 56 advances in the second direction B1, at an angle which differs according to each wavelength, and even when the angle is for the same wavelength, $\epsilon_{52}$, $\epsilon_{51}$, $\epsilon_{50}$, $\alpha_{52}$, $\alpha_{51}$, and $\alpha_{50}$ not being same mutually, the angle differs from a case of the groups 50 and 51. The manner in which the light is dispersed is shown only for five wavelengths in FIG. 25 in a simplified manner.

The second lens 57 is a lens in common for all groups, having a focal length $f_5$, and the dispersive element 56 and the second lens 57 are separated by a distance same as the focal length $f_5$. Therefore, the light which is output from the second lens 57 advances in a direction coinciding for each wavelength, toward mirrors 61a, 61b, 61c, 61d, and 61e of the mirror array 58. Light of each wavelength which has been dispersed by the dispersive element 56 is condensed by the second lens 57, on the mirror 61 (61a, 61b, 61c, 61d, and 61e) corresponding to each wavelength of the mirror array 58.

A position at which the light is condensed is condensed on the mirror 61, in a case when the wavelengths of the connecting port 12a or the plurality of input ports of the group 52 are same, is a position of intersection of that light, and an X-coordinate $X_{52}$ and a Y-coordinate $Y_{52}$ of that position are expressed by the following expressions (16) and (17).

$$X_{52a} = f_5 \tan(\beta_{52a} - \theta c) \quad (16)$$

$$Y_{52} = f_5 \tan \epsilon_{52} \quad (17)$$

$X_{52a}$ is a coordinate of position at which the light is condensed on the mirror 59a, and $X_{52b}$, $X_{52c}$, $X_{52d}$, and $X_{52e}$ corresponding to the mirrors 59b, 59c, 59d, and 59e are expressed similarly as $X_{52a}$, by the abovementioned expression (16).

As shown in the abovementioned expression (16), the X-coordinate depends on a size of an output angle $\beta_{52}$, and the size of the output angle $\beta_{52}$, even when it is for the same wavelength, since $\epsilon_{52} \neq \epsilon_{51} \neq \epsilon_{50}$, or, $\alpha_{52} \neq \alpha_{51} \neq \alpha_{50}$, differs from the size of the output angles $\beta_{50}$ and $\beta_{51}$. Moreover, the Y-coordinate can be calculated by expression (17), and the position of the light condensed by the second lens 57, since $\epsilon_{52} \neq \epsilon_{51} \neq \epsilon_{50}$, differs for both the X-coordinate and the Y-coordinate, according to the group.

Light of wavelengths from $\lambda_1$ to $\lambda_{18}$ which have been dispersed according to the wavelength by the dispersive element 56 are condensed at centers of corresponding mirrors 61a to 61r (FIG. 30). The light which is condensed on these mirrors is incident obliquely on a reflecting surface of the mirror, and is reflected in a direction different from the direction of incidence.

The light which has been reflected by the mirror 61 of the mirror array 58 enters the second lens 57 in the form of a light beam with a flare. The light of each wavelength which has entered the second lens 57, upon becoming collimated light, advances from the second lens 57 toward the dispersive element 56, and is incident to be inclined at an angle $\epsilon_{52}$ with respect to the first direction A1 of the dispersive element 56. When an angle of rotation of each mirror is the same, the light from the second lens 57 is condensed at one point on the dispersive element 56, and light reflected by the connecting port 52a and the plurality of input ports from the mirror array 58 of the group 52, at the time of being incident on the dispersive element 56, is incident at the same location as the group 50 and the group 51 which are different groups.

The light which has been wavelength-multiplexed by the dispersive element 56 enters the first lens 55 while maintaining the state of being collimated, and is condensed by the first lens 55. A position at which the light is condensed is a position of intersection of the light reflected by the connecting port 52a and the plurality of input ports from the mirror array 58 of the group 52, and this position is a position of intersection with an optical axis of a lens corresponding to the group 52, of the second lens array 54.

The light which has been condensed by the first lens 55 is collimated by the lens corresponding to the group 52, of the second lens array 54, and enters a lens of the first lens array 53 corresponding to the output port 52e. The light which has entered the lens of the first lens array 53 corresponding to the output port 52e is condensed at the output port 52e.

By making such an arrangement, as compared to a case in which, a conventional wavelength selective switch 500 having a conventional structure as in FIGS. 35 and 36 is let to be multiple-staged, it is possible to make the first lens 55, the dispersive element 56, and the second lens 57 common for all the groups, and to reduce the cost substantially. Moreover, by making the first lens 55, the dispersive element 56, and the second lens 57 common, it is possible to shorten a time for assembling. Furthermore, since it is possible to integrate the input ports, the output ports, the first lens array 53, and the second lens array 54 by making multiple-staged structure, it is possible to reduce the cost substantially.

The rest of the structure, action, and effect are similar as in the first embodiment.

(Fifth Embodiment)

For a wavelength selective switch 105 according to a fifth embodiment of the present invention, in the arrangement of the wavelength selective switch 104 according to the fourth embodiment shown in diagrams from FIG. 18 to FIG. 30, $|\epsilon_{50}|$ is let to be $|\epsilon_{52}|$ ($|\epsilon_{50}|=|\epsilon_{52}|$), and $\alpha_{50}$ is let to be $\alpha_{52}$ ($\alpha_{50}=\alpha_{52}$) and a relationship of $\epsilon_{50}$ and $\alpha_{50}$ is selected such that $X_{50a} \ldots, X_{51a} \ldots,$ and $X_{52a} \ldots$ are same mutually. The rest of the arrangement is similar as in the wavelength selective switch 104 according to the fourth embodiment, and same reference numerals are assigned to members which are same as in the fourth embodiment.

Figure 31:
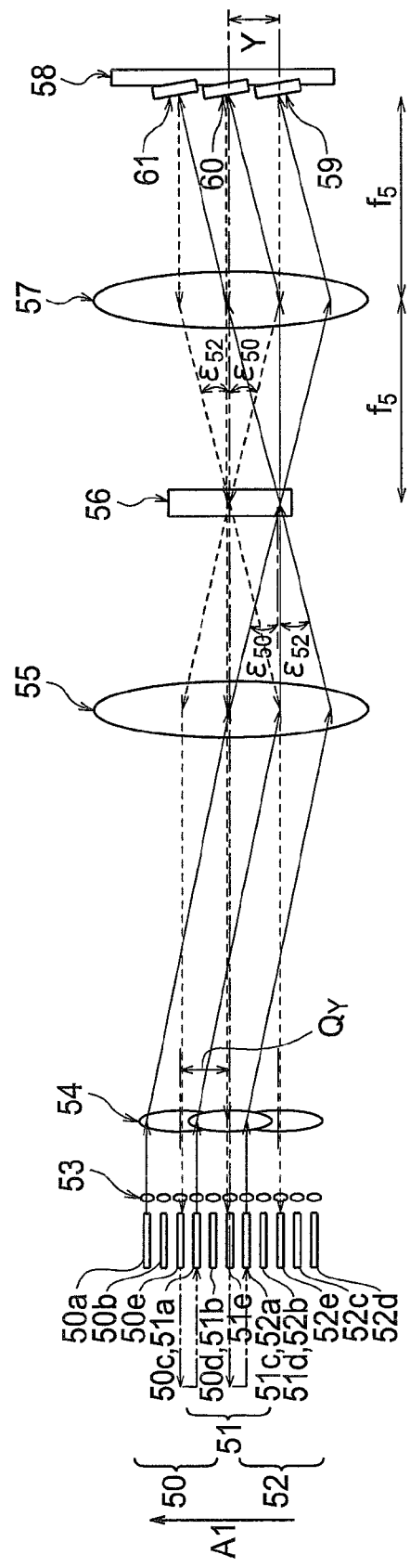
FIG. 31 is a side view showing a structure of a wavelength selective switch according to a fifth embodiment.
Figure 32:
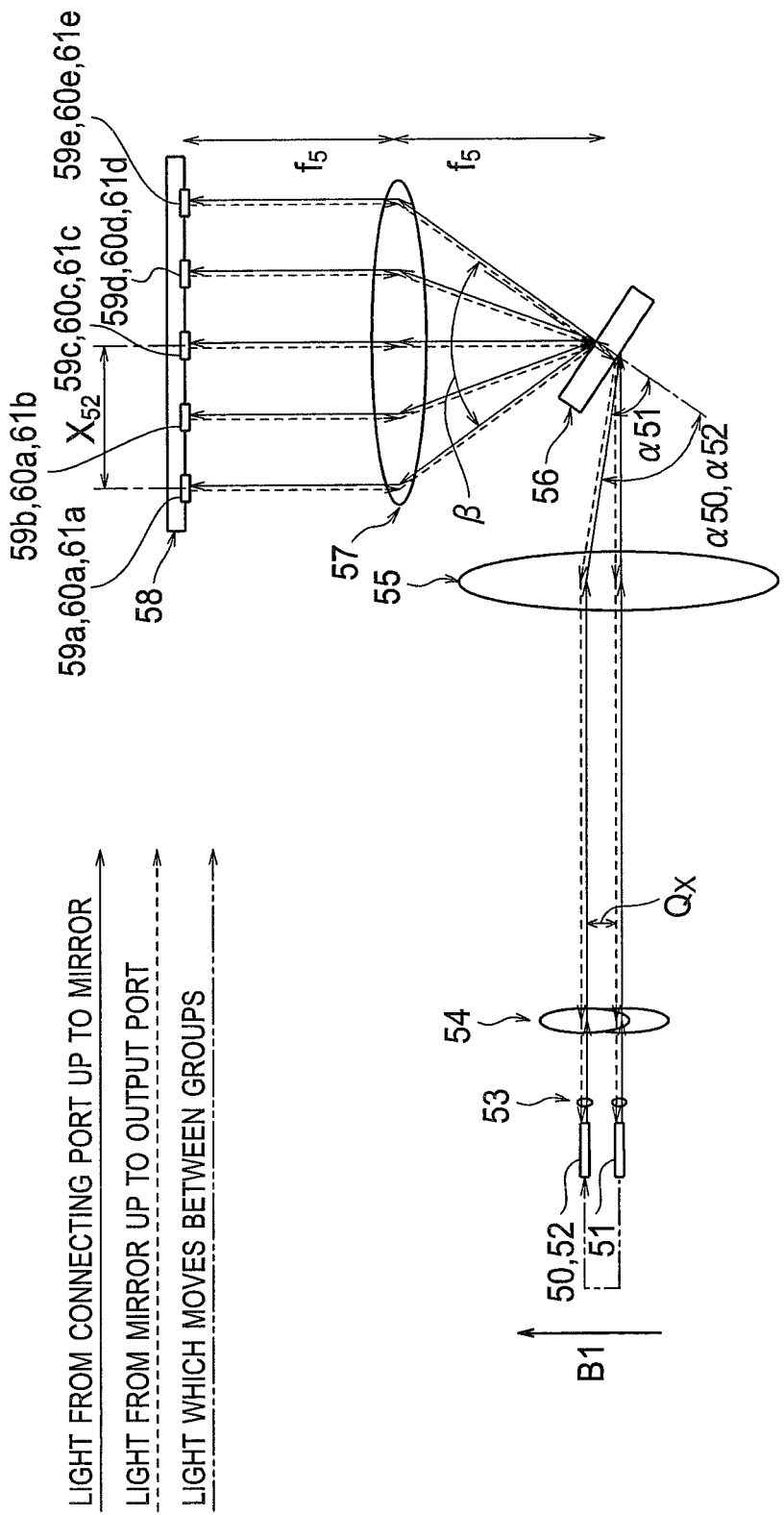
FIG. 32 is a top view showing a structure of the wavelength selective switch according to the fifth embodiment.
Figure 33:
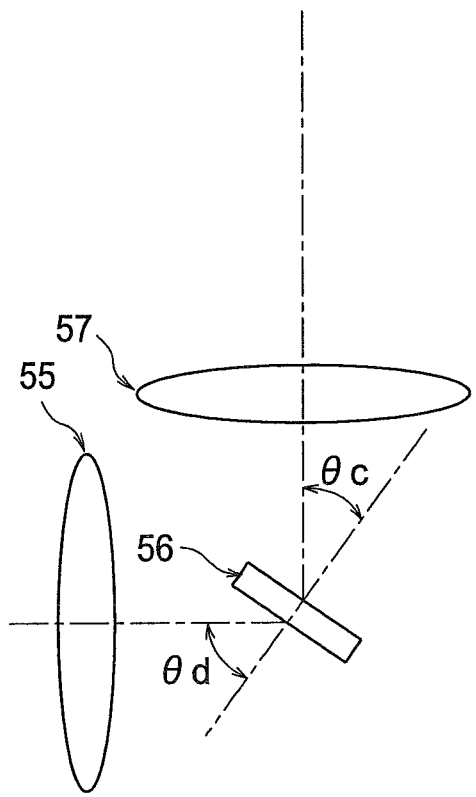
FIG. 33 is a diagram in which, a dispersive element and a second lens in FIG. 32 are shown in an enlarged form.

Here, FIG. 31 is a side view showing a structure of the wavelength selective switch 105. FIG. 32 is a top view showing the structure of the wavelength selective switch 105. FIG. 33 is a diagram in which, the dispersive element 56 and the second lens 57 are shown in an enlarged form. FIG. 31 shows a path of light since the light is input from the input port 50a till the light is condensed at the connecting port 50e, a path of light since light which has been condensed at the connecting port 50e is input from the connecting port 51a till the light is condensed at the connecting port 51e, and a path of light since the light which has been condensed at the connecting port 51e is input from the connecting port 52a, till the light is condensed at the output port 52e.

The light which has been input from the plurality of input ports of the group 50 is condensed in a state of the wavelengths separated, at a position of the mirror array 58. A relationship of $\epsilon_{50}$ and $\alpha_{50}$ is selected to be such that a position at which the light is condensed in the second direction B1 and a position at which the light is condensed in a case of the group 51 coincide mutually. In the fifth embodiment, for simplifying the description, only a case in which, $|\epsilon_{50}|=|\epsilon_{52}|$, and $\alpha_{50}=\alpha_{52}$ is described. However, $|\epsilon_{50}|$ may not be equal to $|\epsilon_{52}|$, ($|\epsilon_{50}|\neq|\epsilon_{52}|$) and $\alpha_{50}$ may not be equal to $\alpha_{52}$ ($\alpha_{50}\neq\alpha_{52}$).

Concretely, wavelength-multiplexed light of the plurality of input ports of the group 50 is incident such that angles $\alpha_{50}$ and $\epsilon_{50}$ at which the light is incident on the dispersive element 56 are related by a relation in the following expression (18).

$$\sin \alpha_{50} - \sin \alpha_{51} = (m\lambda/d)[(1/\cos \epsilon_{50})-1] \quad (18)$$

where, m denotes an diffraction order of a diffractive grating, d denotes a pitch of the diffractive grating, $\lambda$ denotes a wavelength, and $\alpha_{51}$ denotes an angle of incidence of the second direction of the group 51 with respect to the dispersive element 56.

In the fifth embodiment, for simplifying the description, as the angle $\alpha_{51}$, an angle when an angle $\epsilon_{51}$ of light with respect to the first direction A1 incident on the dispersive element 56 is zero is indicated. However, $\epsilon_{51}$ may not be equal to zero ($\epsilon_{51}\neq 0$), and a relationship of $\alpha_{50}$ and $\epsilon_{50}$ in this case is expressed by the following expression (19)

$$\sin \alpha_{50} - \sin \alpha_{51} = (m\lambda/d)[(1/\cos \epsilon_{50})-(1/\cos \epsilon_{51})] \quad (19).$$

$\alpha_{50}$ and $\epsilon_{50}$ are determined by $Q_X$ and $Q_Y$ which are amounts of shift of the optical axis of the first lens 55 and an optical axis of the lens corresponding to the group 50 of the second lens 54 respectively, as in the following expressions (20) and (21).

$$\alpha_{50} = \tan^{-1}(Q_X/f_6) + \theta_d \quad (20)$$

$$\epsilon_{50} = \tan^{-1}(Q_Y/f_6) \quad (21)$$

where, $f_6$ denotes a focal length of the first lens 55, and $\theta_d$ denotes an angle made by the optical axis of the first lens 55 and the normal line of the dispersive element 56.

Figure 34:
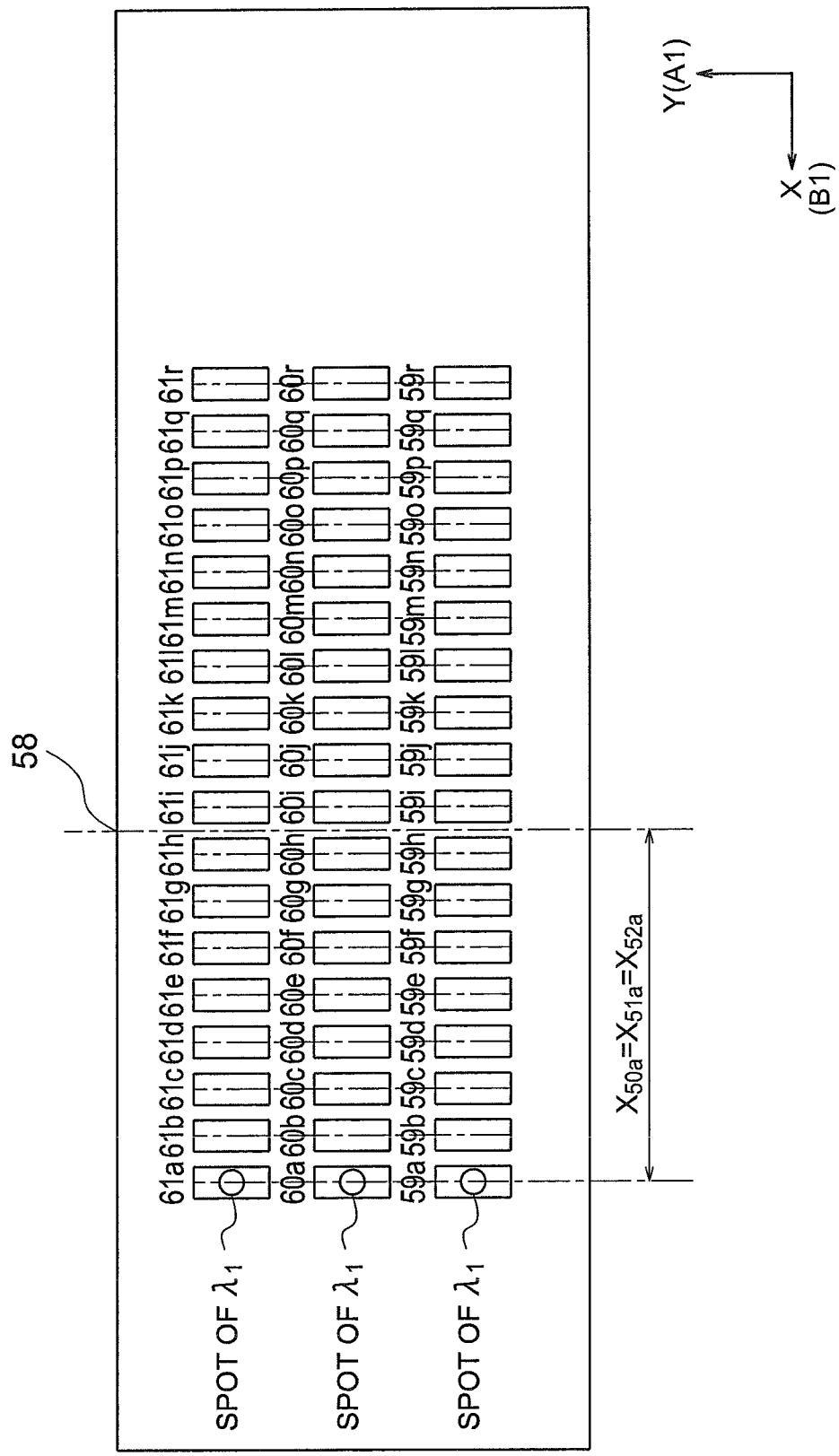
FIG. 34 is a plan view showing a structure of a mirror array, and spot positions of light of a wavelength $\lambda_1$ of a group 11 and 12, of the fifth embodiment.

In the wavelength selective switch 105 according to the fifth embodiment, $\alpha_{50}$ and $\epsilon_{50}$ are changed by shifting the optical axis of each lens of the second lens array 54, and the abovementioned expression (18) is let to be held true. Accordingly, a position in X-direction of the light condensed at the mirror array 58 of the group 50 becomes same as a position in the X-direction of light condensed at the mirror array 58 of the group 52 and the group 51 (FIG. 34). FIG. 34 is a plan view showing a structure of the mirror array 58, and spot positions of light of a wavelength $\lambda_1$ of the groups 50, 51, and 52.

By making such an arrangement, there ceases to be a difference in a mirror pitch of the mirror array 56, according to the group, and it is possible to manufacture the mirror array 58 easily. Moreover, since the spots are aligned at the same position in the second direction B2, assemblability is improved.

The rest of the structure, action, and effect are similar as in the fourth embodiment.

As it has been described above, the wavelength selective switch according to the present invention is useful when the number of ports is to be increased while suppressing the cost necessary for the overall apparatus.

The wavelength selective switch according to the present invention shows an effect that it is possible to increase the number of ports without leading to an increase in the cost, size, and weight.

What is claimed is:

1. A wavelength selective switch comprising:
   a light input output portion having m groups of ports, wherein m is an integer greater than one, wherein each group of ports includes at least an input port and an output port for wavelength-selective switching wavelength-multiplexed light therebetween, wherein the ports of each group are arranged in an array-form extending in a first direction, and wherein the m groups are offset with respect to each other in the first direction;
   a light dispersive unit which separates the wavelength-multiplexed light which has been input from the input port, into respective signal wavelengths spread out in a second direction perpendicular to the first direction;
   a condenser element which condenses light which has been separated into the signal wavelengths; and
   a light deflective element array which deflects the signal light in the first direction such that, respective signal wavelength light which has been condensed by the condenser element is switched to a desired output port, wherein
   the light deflective element array is arranged in m rows of light deflective elements extending in the second direction, wherein the m rows are offset with respect to each other in the first direction and correspond respectively to the m groups of ports of the light input output portion, and
   wherein the light dispersive unit is in common for the m groups of ports of the light input output portion.

2. The wavelength selective switch according to claim 1, wherein light from the input port corresponding to each of the m groups of ports of the light input output portion is incident at substantially the same position at the light dispersive unit.

3. The wavelength selective switch according to claim 2, wherein in the second direction, a position of the light deflective element array corresponding to different wavelengths is same within each of the m groups of ports of the light input output portion.

4. The wavelength selective switch according to claim 2, further comprising a lens array including m lenses spaced apart in the first direction, wherein each of the m lenses is coupled to each port of a corresponding one of the m groups of ports, for condensing light from the input port from the corresponding one of the m groups of ports at a position which differs for each of the m groups of ports.

5. The wavelength selective switch according to claim 4, further comprising a first lens for coupling the light condensed at the positions which differ for each of the m groups of ports to the substantially same position at the light dispersive unit.

6. The wavelength selective switch according to claim 1, wherein in the second direction, a position of the light deflective element array corresponding to different signal wavelengths is same within each of the m groups of ports of the light input output portion.

7. The wavelength selective switch according to claim 1, wherein the m groups of ports are offset with respect to each other in the second direction.

8. The wavelength selective switch according to claim 7, wherein light from the input port corresponding to each of the m groups of ports of the light input output portion is incident at substantially the same position at the light dispersive unit.

9. The wavelength selective switch according to claim 8, wherein in the second direction, a position of the light deflective element array corresponding to different signal wavelengths is same within each of the m groups of ports of the light input output portion.

10. The wavelength selective switch according to claim 8, further comprising a lens array including m lenses spaced apart in the first direction and in the second direction, wherein each of the m lenses is coupled to each port of a corresponding one of the m groups of ports, for condensing light from the input port from the corresponding one of the m groups of ports at a position which differs for each of the m groups of ports.

11. The wavelength selective switch according to claim 10, further comprising a first lens for coupling the light condensed at the positions which differ for each of the m groups of ports to the substantially same position at the light dispersive unit.

12. The wavelength selective switch according to claim 7, wherein in the second direction, a position of the light deflective element array corresponding to different wavelengths is same within each of the m groups of ports of the light input output portion.

\* \* \* \* \*